(12) United States Patent
Schrubbe

(10) Patent No.: US 9,803,998 B1
(45) Date of Patent: Oct. 31, 2017

(54) ABSOLUTE POSITION SENSOR WITH FINE RESOLUTION

(71) Applicant: Joral, LLC, Mukwonago, WI (US)

(72) Inventor: Carl D. Schrubbe, Waukesha, WI (US)

(73) Assignee: Joral LLC, Mukwonago, WI (US)

( * ) Notice: Subject to any disclaimer, the term of this patent is extended or adjusted under 35 U.S.C. 154(b) by 154 days.

(21) Appl. No.: 14/636,169

(22) Filed: Mar. 2, 2015

Related U.S. Application Data

(60) Provisional application No. 62/127,087, filed on Mar. 2, 2015, provisional application No. 61/922,563, filed on Dec. 31, 2013.

(51) Int. Cl.
    *G01B 7/14* (2006.01)
    *G01D 5/14* (2006.01)

(52) U.S. Cl.
    CPC .................. *G01D 5/145* (2013.01)

(58) Field of Classification Search
    CPC ...... G01D 5/145; G01D 5/2457; G01D 5/142; G01R 15/20; G01R 15/202
    See application file for complete search history.

(56) References Cited

U.S. PATENT DOCUMENTS

| | | |
|---|---|---|
| 3,780,313 A | 12/1973 | Wiegand |
| 3,820,090 A | 6/1974 | Wiegand |
| 3,892,118 A | 7/1975 | Wiegand |
| 4,150,314 A | 4/1979 | Zabler et al. |
| 4,157,482 A | 6/1979 | Kakinuma |
| 4,247,601 A | 1/1981 | Wiegand |
| 4,263,523 A | 4/1981 | Wiegand |
| 4,309,628 A | 1/1982 | Wiegand |
| 4,503,391 A | 3/1985 | Hinke |
| 4,579,008 A | 4/1986 | Bohm et al. |
| 4,639,670 A * | 1/1987 | Normann ............... G01R 33/02 310/152 |
| 4,794,209 A * | 12/1988 | Asada .................... G01B 7/004 178/19.06 |

(Continued)

FOREIGN PATENT DOCUMENTS

| | | |
|---|---|---|
| AU | 2004100358 | 6/2004 |
| CA | 2774702 | 10/2012 |

(Continued)

OTHER PUBLICATIONS

Tulk, Jim, Innovative Encoders for Demanding Applications, Posital—Fraba, Mar. 13, 2009.

(Continued)

*Primary Examiner* — Tung X Nguyen
*Assistant Examiner* — Dominic Hawkins
(74) *Attorney, Agent, or Firm* — Boyle Fredrickson S.C.

(57) ABSTRACT

An absolute position sensor having a detector with a plurality of Wiegand wire sensors that each have a pair of Hall sensors bracketing or straddling the Wiegand wire used by a processor in interpolating relative ratios of signals from the bracketing Hall sensors in not only providing increased fine position determination between magnets but also providing coarse position count increment or decrement verification. Such an absolute position sensor provides increased fine position determination accuracy while also enhancing increment and/or decrement error prevention and/or correction during position sensor operation.

24 Claims, 35 Drawing Sheets

(56) References Cited

U.S. PATENT DOCUMENTS

| | | | | |
|---|---|---|---|---|
| 5,057,727 A * | 10/1991 | Jones | ............... | G01P 3/4815 310/111 |
| 5,068,529 A * | 11/1991 | Ohno | ............... | G01D 5/2492 250/231.18 |
| 5,663,641 A | 9/1997 | Morita | | |
| 5,898,241 A | 4/1999 | Ganderillas | | |
| 6,097,183 A * | 8/2000 | Goetz | ............... | G01D 5/145 324/207.12 |
| 6,140,636 A * | 10/2000 | Norton | ............... | G01D 5/34792 250/231.18 |
| 6,163,746 A * | 12/2000 | Moerbe | ............... | G01D 5/145 324/207.11 |
| 6,229,300 B1 | 5/2001 | Dlugos | | |
| 6,242,906 B1 * | 6/2001 | Andermo | ............... | G01D 5/2053 324/202 |
| 6,466,011 B1 * | 10/2002 | Imanaka | ............... | G01D 5/145 324/207.21 |
| 7,025,328 B2 | 4/2006 | Ulicny et al. | | |
| 7,908,762 B2 | 3/2011 | Siraky | | |
| 8,111,065 B2 | 2/2012 | Mehnert et al. | | |
| 8,283,914 B2 | 10/2012 | Mehnert et al. | | |
| 8,294,457 B2 | 10/2012 | Schrubbe et al. | | |
| 8,327,553 B2 | 12/2012 | Matzker et al. | | |
| 8,655,615 B2 | 2/2014 | Mehnert et al. | | |
| 8,766,625 B2 | 7/2014 | Mehnert et al. | | |
| 9,018,943 B2 | 4/2015 | Schrubbe | | |
| 9,374,948 B2 | 6/2016 | Schrubbe et al. | | |
| 9,528,856 B2 | 12/2016 | Gehringer et al. | | |
| 2003/0094945 A1 * | 5/2003 | Netzer | ............... | G01D 5/2515 324/260 |
| 2007/0236223 A1 * | 10/2007 | Wallrafen | ............... | G01D 5/145 324/378 |
| 2008/0180864 A1 * | 7/2008 | Meguro | ............... | G01R 33/093 360/324.11 |
| 2009/0167713 A1 * | 7/2009 | Edwards | ............... | G06F 3/044 345/173 |
| 2010/0213927 A1 * | 8/2010 | Mehnert | ............... | G01P 3/4815 324/207.2 |
| 2011/0006757 A1 * | 1/2011 | Mehnert | ............... | G01D 5/145 324/207.2 |
| 2011/0184691 A1 | 7/2011 | Mehnert et al. | | |
| 2012/0152049 A1 * | 6/2012 | Benson | ............... | F16H 59/044 74/473.3 |
| 2012/0268109 A1 * | 10/2012 | Mehnert | ............... | G01P 3/4815 324/207.15 |

FOREIGN PATENT DOCUMENTS

| | | |
|---|---|---|
| DE | 3219491 | 12/1983 |
| DE | 3302084 | 7/1984 |
| DE | 102005006419 | 12/2005 |
| DE | 102005009489 | 8/2006 |
| DE | 102005035571 | 2/2007 |
| DE | 102010010239 | 9/2011 |
| EP | 0484716 | 5/1992 |
| GB | 2050627 | 1/1981 |
| GB | 1590368 | 6/1981 |
| GB | 2071336 | 9/1987 |
| WO | 9954685 | 10/1999 |

OTHER PUBLICATIONS

White Paper, Re-Inventing the Rotary Encoder: The No-Compromise IXARC from Posital, Posital—Fraba.

* cited by examiner

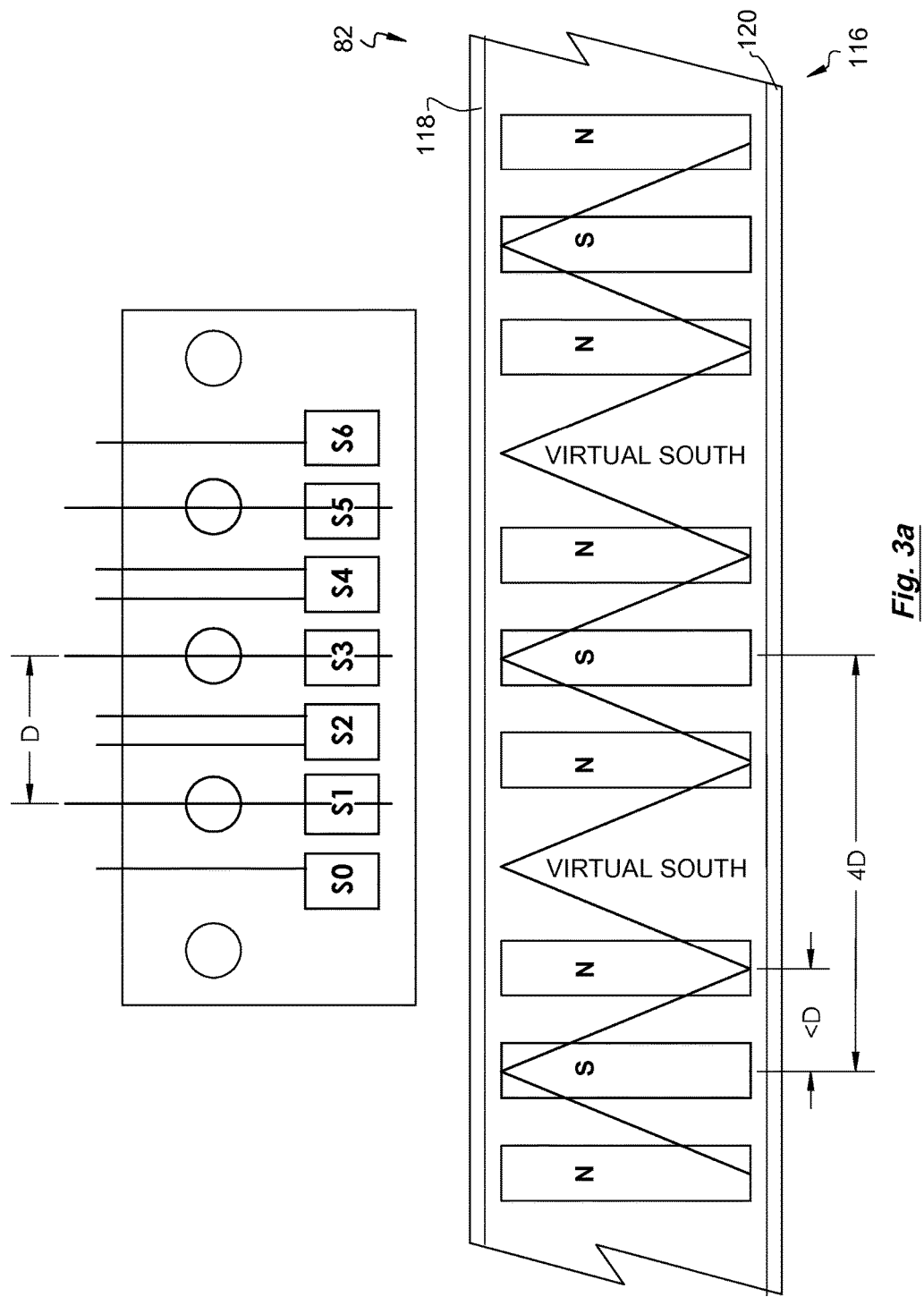

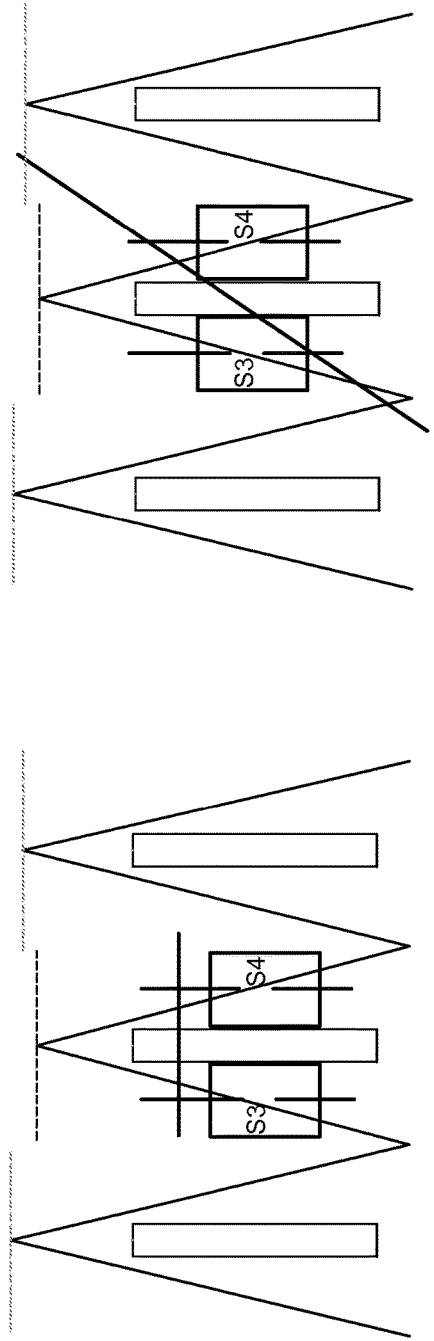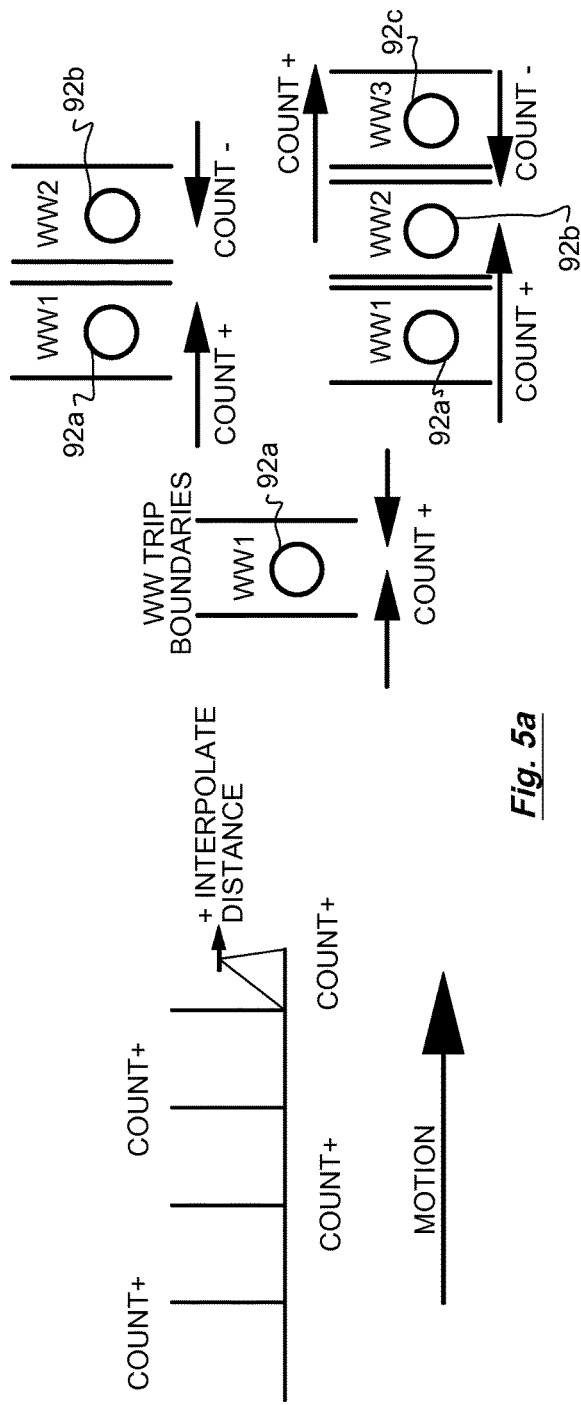
*Fig. 5a*

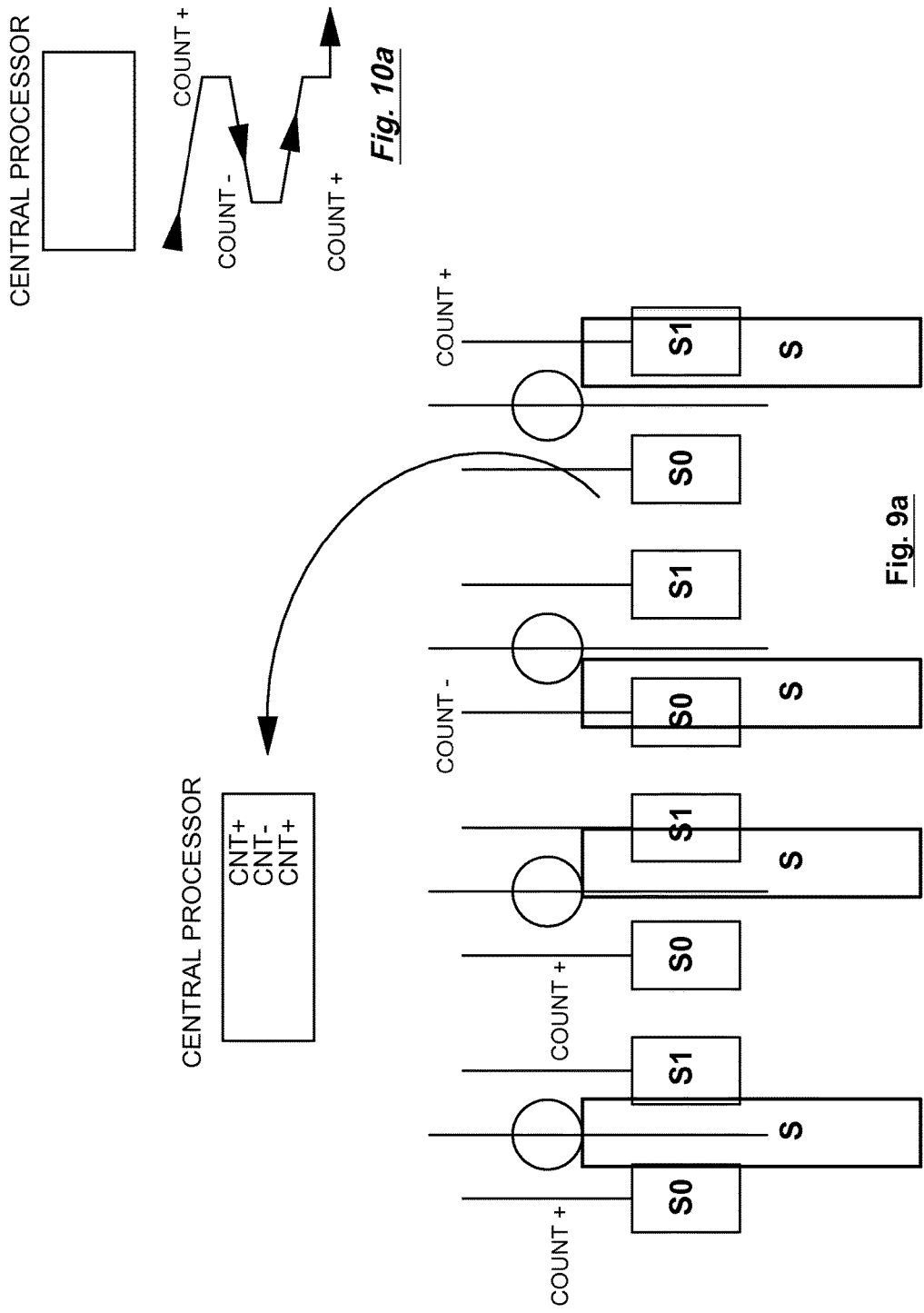

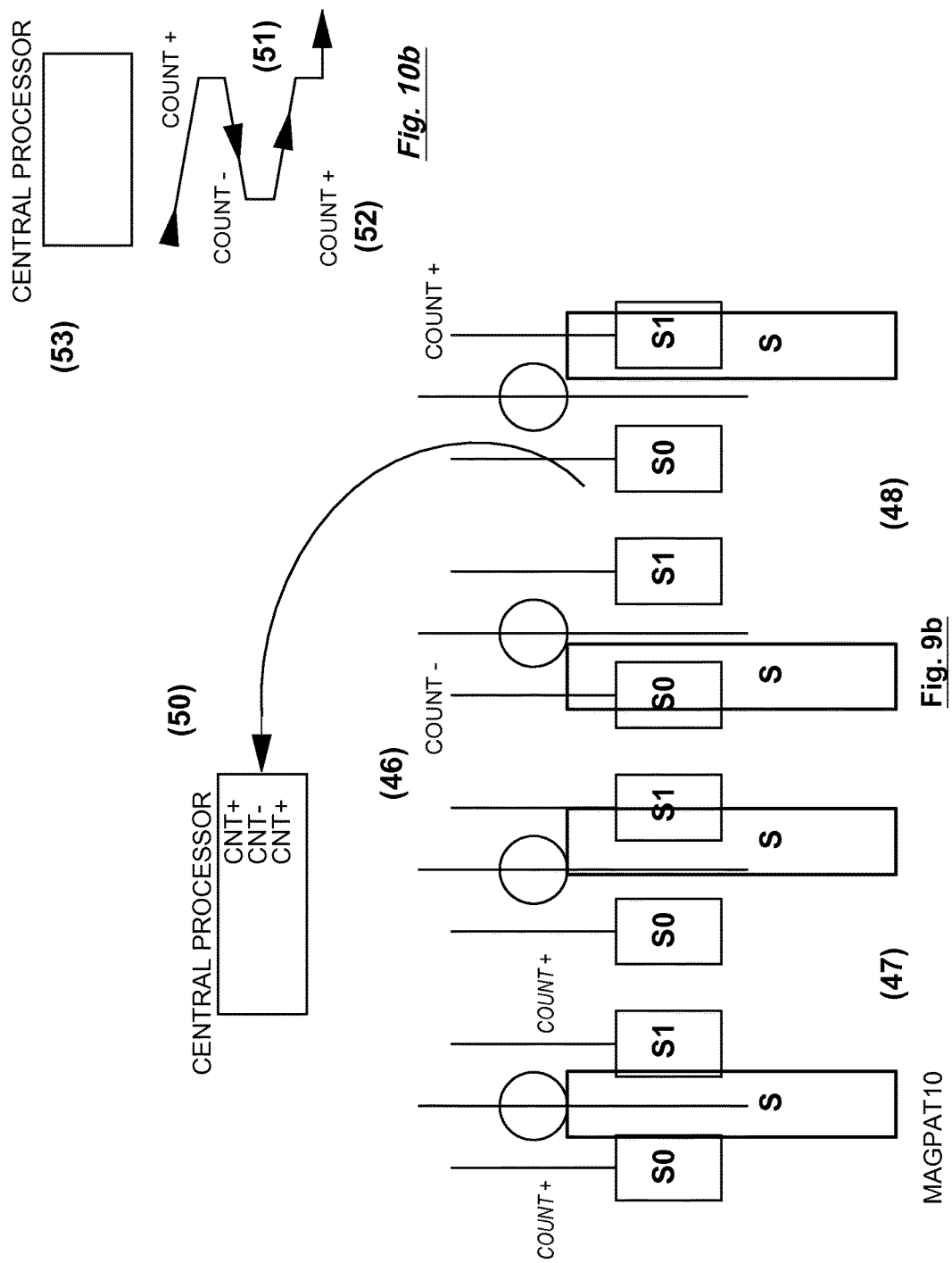

ABSOLUTE POSITION SENSOR WITH FINE RESOLUTION

CROSS-REFERENCE

Pursuant to 35 U.S.C. §119(e), this application claims all benefits to and priority in U.S. Provisional Application Ser. No. 61/922,563, filed on Dec. 31, 2013, and U.S. Provisional Application Ser. No. 62/127,087, filed on Mar. 2, 2014, the entirety of each of which is hereby expressly incorporated by reference herein.

FIELD

The present invention relates generally to position sensors including linear and rotary position sensors, and more particularly to a position sensor that provides fine position resolution capable of use in linear and rotary position sensing applications.

BACKGROUND

Many attempts have been made to measure position using linear and rotary position measurement devices that employ a wide variety of different types of position sensing systems using different types of position sensing head arrangements, sensing elements, circuits, techniques and methods with varying degrees of success. Many of these position measurement devices have position determining systems equipped with a fine position sensing system used to determine fine position and a coarse position sensing system designed to determine and retain a position state using power generated by the coarse position sensing system during coarse position sensing system operation. Such position measurement devices equipped with coarse position sensing systems configured to at least partially or even completely power the position determining system are expensive, are relatively inflexible in their implementation, and can suffer coarse position determination problems.

One example of such position measurement device is the angle of rotation position sensing device disclosed in U.S. Pat. No. 6,084,400 equipped with a self-powered position determining system having a fine position sensing system and coarse position sensing system self-powered by the coarse position sensing system without the use of any battery or external power supply. The fine position sensing system is provided by a fine angle rotation sensor, such as in the form of a magnetic or optical encoder or resolver, linked to the rotary shaft and is used to relatively precisely sense an angle of the shaft. The coarse position sensing system is provided by a shaft rotation counter formed of an arrangement of radially extending Wiegand wires circumferentially spaced apart about part of the shaft with electrical pulses from the Wiegand wires during shaft rotation that provide shaft rotation count while also powering the position determining system.

Another example is the absolute position measurement device disclosed in U.S. Pat. No. 8,283,914, which discloses a position determining system having a fine position sensing system using hall sensors and a coarse position sensing system using Wiegand wires and another hall sensor. Electrical pulses from the Wiegand wires generated during shaft rotation can be used to power an electronic management unit that updates a counting unit having non-volatile memory storage with coarse position data while also storing some of the electrical pulse energy for later use. External power can be supplied to a fine resolution counting or position measurement logic unit that processes the fine position sensor data from the fine position sensing hall sensors and the coarse position data to provide position information via a user interface to a user or operator.

These types of position determining systems are generally limited to use in rotary position sensing devices, including shaft turn counters and multiple-turn absolute position sensing devices. Even where adapted for use in linear position measurement applications, the components required to eliminate or minimize the need for a battery or use of an external supply include types of non-volatile memory, such as ferromagnetic RAM, and other low power components, such as very low power gate arrays, which are expensive, add complexity, inflexible and can limit the resolution of fine position determination that can be achieved.

What is needed is an improved position measurement device that can be equipped with a battery, yet which minimizes power usage, all without requiring such expensive low power components found in the prior art.

SUMMARY

The present invention is directed to a position sensor that preferably is an absolute position sensor that even more preferably is well suited for use as an absolute linear position sensor. While such a position sensor constructed in accordance with the present invention is capable of "infinite length" use, it should be readily apparent that it is not limited to "infinite length" use. The position sensor has a positional signal emitting arrangement that can be formed of a long line (string) of spaced apart magnets mounted to or otherwise carried by or in a track, or other holder and/or arranged in such a manner using another suitable mounting method. A Detector passes over the track in a continuous fashion. A first detector circuit reads and counts each desired magnet pole as it passes over it, to accumulate the incremental distance between each magnet. The sum of magnet distances is then added to the distance calculated by the second detector circuit which interpolates the magnetic flux strength between the incremental magnets. The length of the magnet track limited only by the number of bytes used to store the incremental data.

In one preferred embodiment, a 64 bit number or result obtained where magnets at ½ inch intervals would theoretically enable measurement of lengths or distances as great as 1.455 EE 14 miles with interpolating to 8 bits of data using a method of interpolation in accordance with that disclosed herein results in fine position determination to within 0.003 inch accuracy. In other word, fine position measurement accuracy is provided with a position sensor constructed in accordance with the present invention that is greater than believed previously done in conventional linear position sensors.

Components of a preferred embodiment of an absolute position sensor equipped with a position determining system having fine position resolution using interpolation in accordance with the present invention include (a) an elongate track containing magnets spaced at even intervals; (b) a detector comprised of two separate measuring elements including (i) digital (on/off) value sensors to detect and count the magnets on an incremental basis providing coarse position, and (ii) analog (scalar) value sensors used in interpolating the position between the incremental magnets providing fine position, and (c) a processor, preferably a central processor, used to (i) sum and store incremental magnet count to provide coarse position and/or coarse motion, and (ii) process and the scalar magnetic flux values to resolve fine position between magnets. The detectpr is comprised of two parts, the incremental counting unit or subsystem—ICU, which provide coarse position, and the magnetic (flux) interpolation unit—MIU, which is a fine position resolution subsystem that provides fine position. The position being the detector being the sum of the data contained in the ICU plus the MIU.

DRAWING DESCRIPTION

One or more preferred exemplary embodiments of the invention are illustrated in the accompanying drawings in which like reference numerals represent like parts throughout and in which:

FIGS. 1A and 1B are schematic views of a preferred embodiment of an absolute position sensor constructed in accordance with the present invention having a position sensing detector offset to one side of a positional signal emitting arrangement equipped with spaced apart positional signal emitters instead of the detector being on top of the positional signal emitting arrangement when in a normal operating configuration;

FIGS. 3A and 3B are third schematic views of the absolute position sensor of FIG. 1A;

Figure 1A:
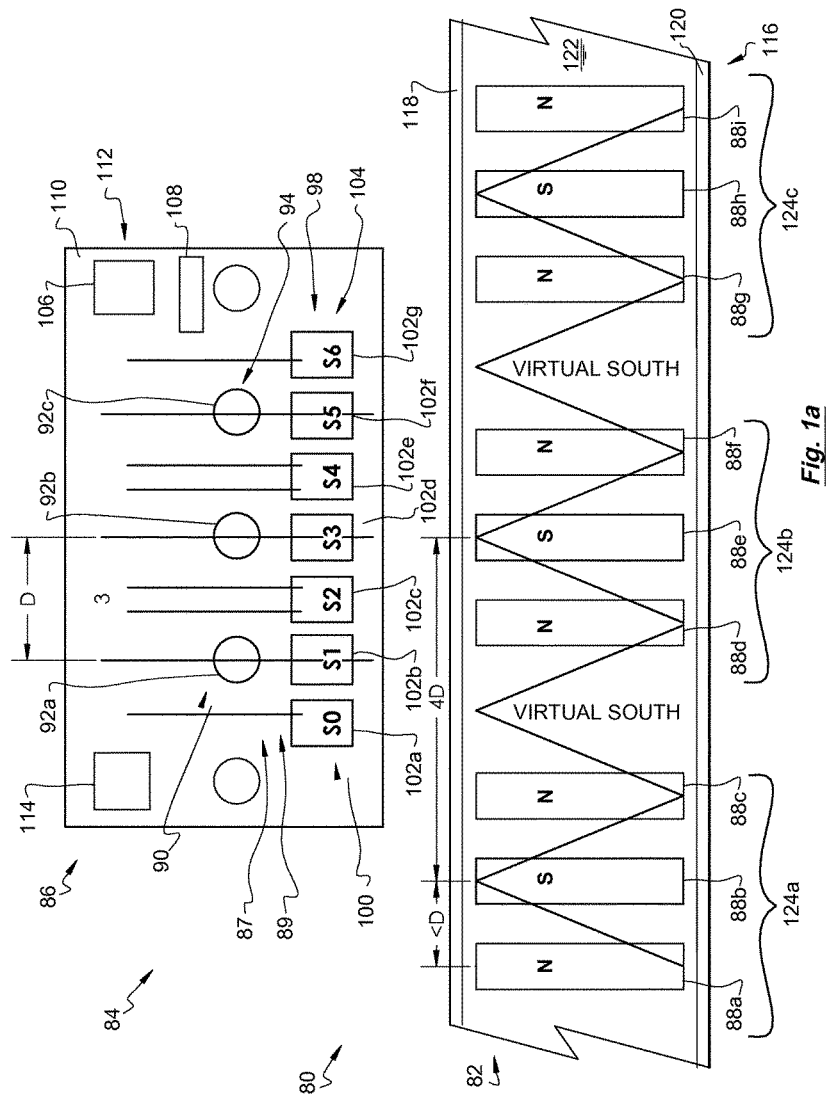
Figure 1B:
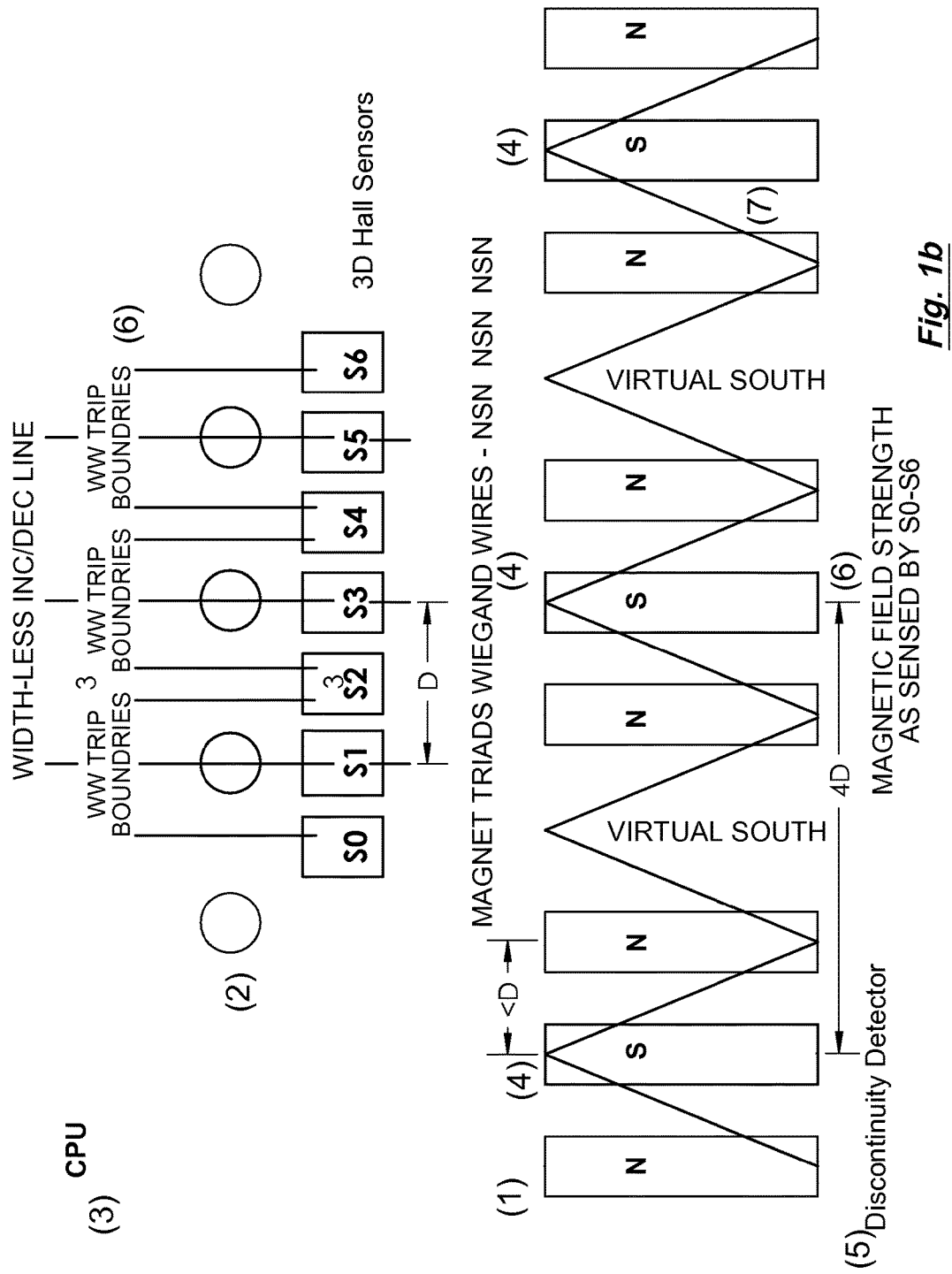
Figure 2A:
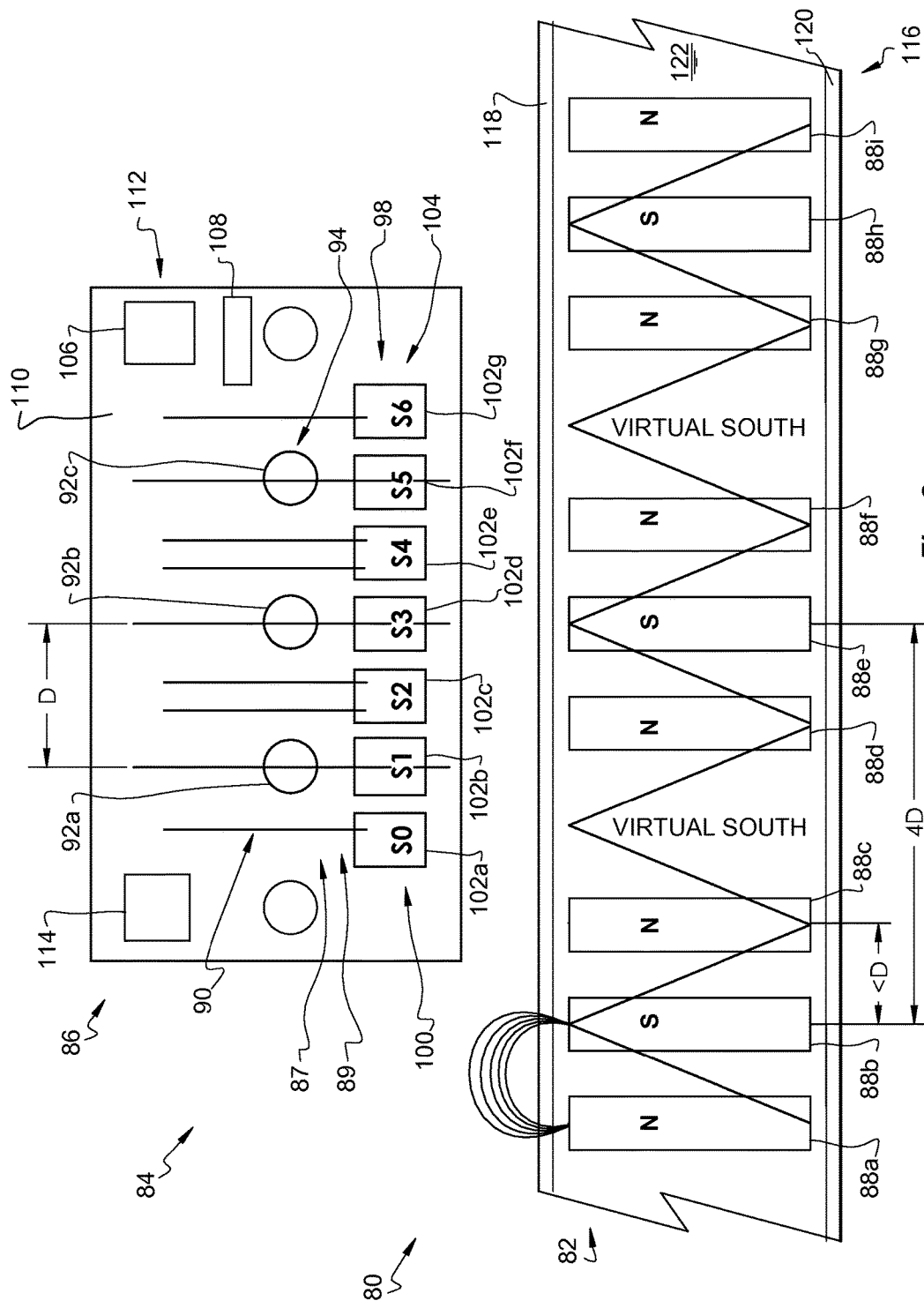
FIGS. 2A and 2B are second schematic views of the absolute position sensor of FIG. 1A illustrating magnetic flux or a magnetic field emanating from a pair of adjacent positional magnetic field signal emitting magnets.
Figure 2B:
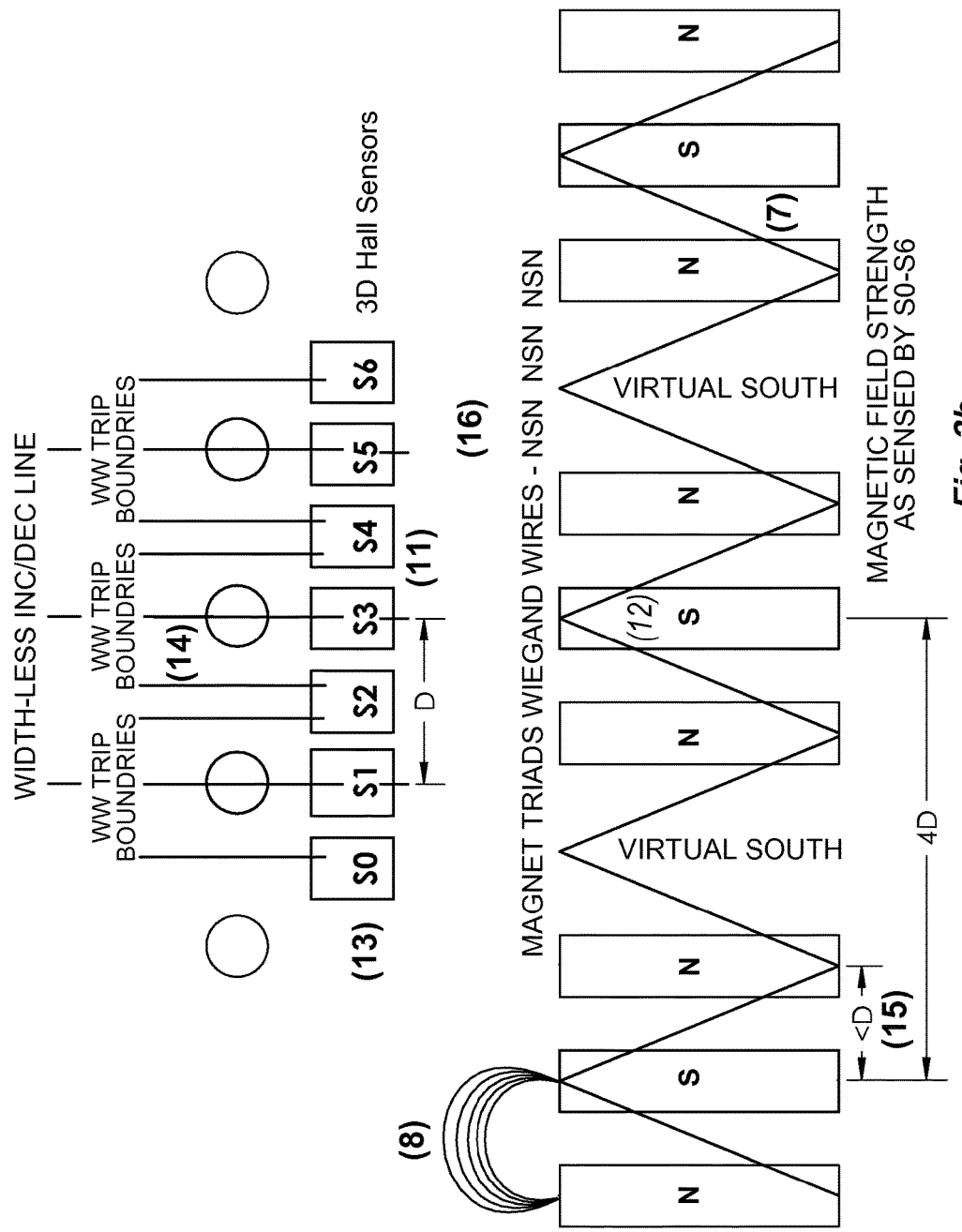
Figure 3B:
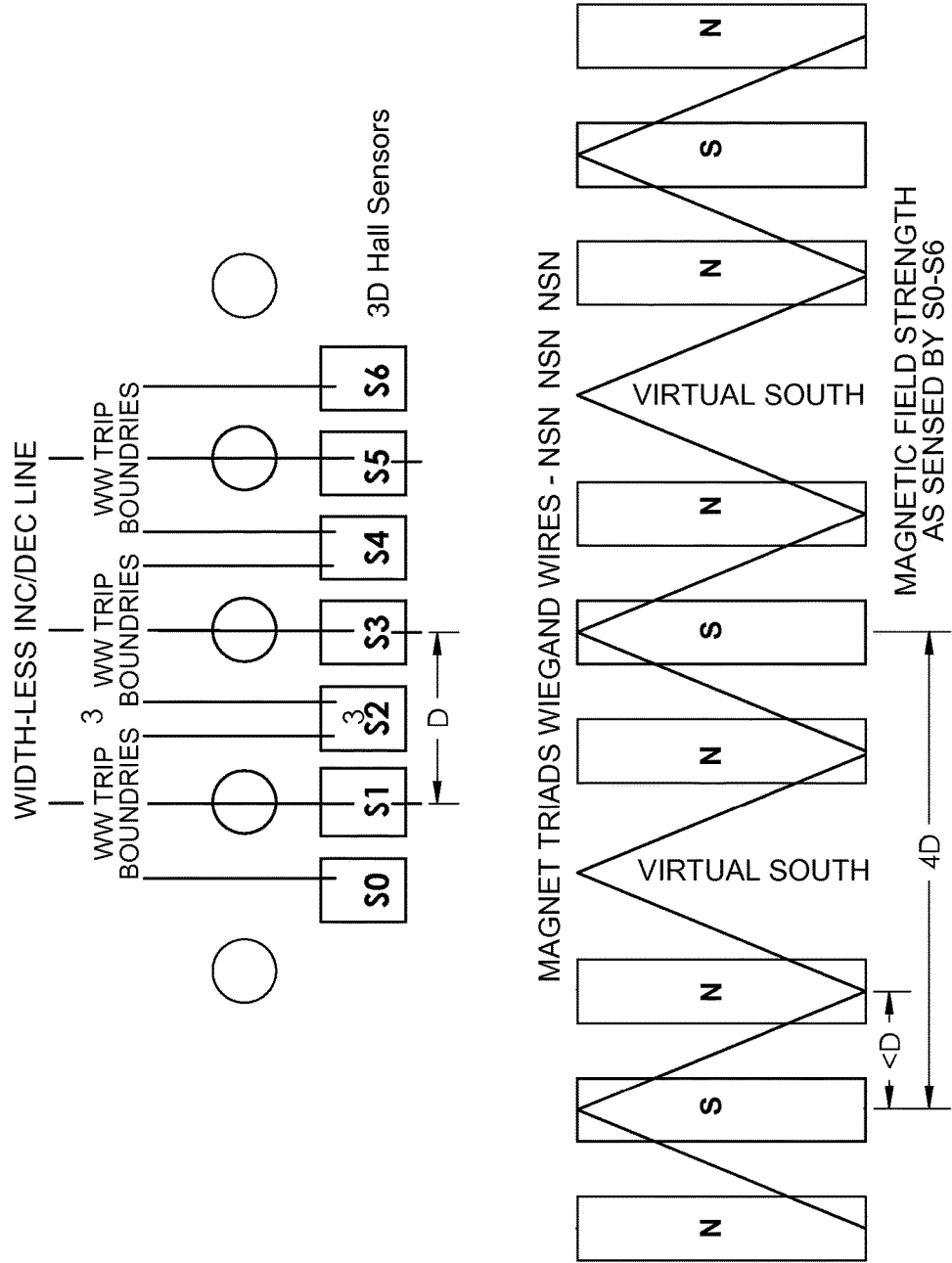
Figure 4A:
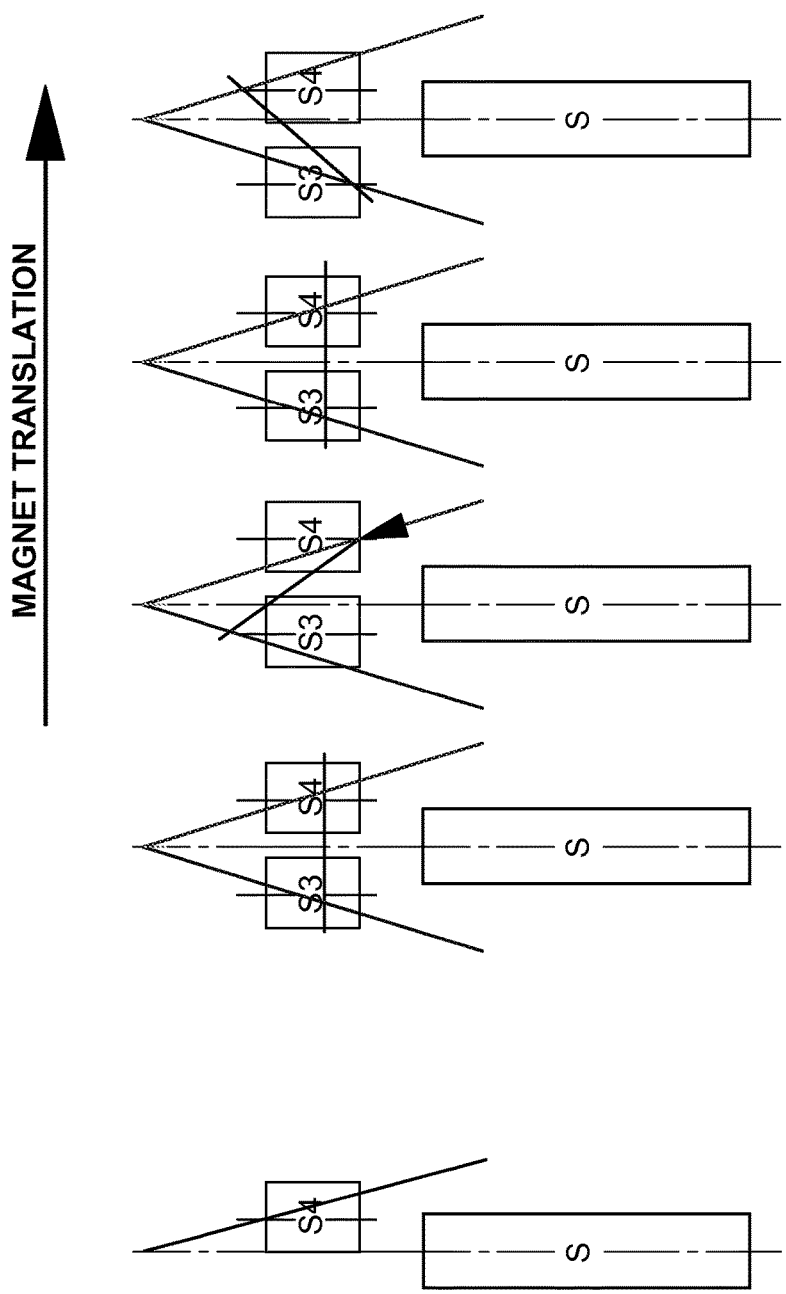
FIGS. 4A and 4B is a schematic view illustrating three different Hall effect sensor return value signal conditions (40), (41) and (42) during relative movement or translation between the detector and a positional signal emitting arrangement equipped with spaced apart positional signal emitter magnets.
Figure 4B:
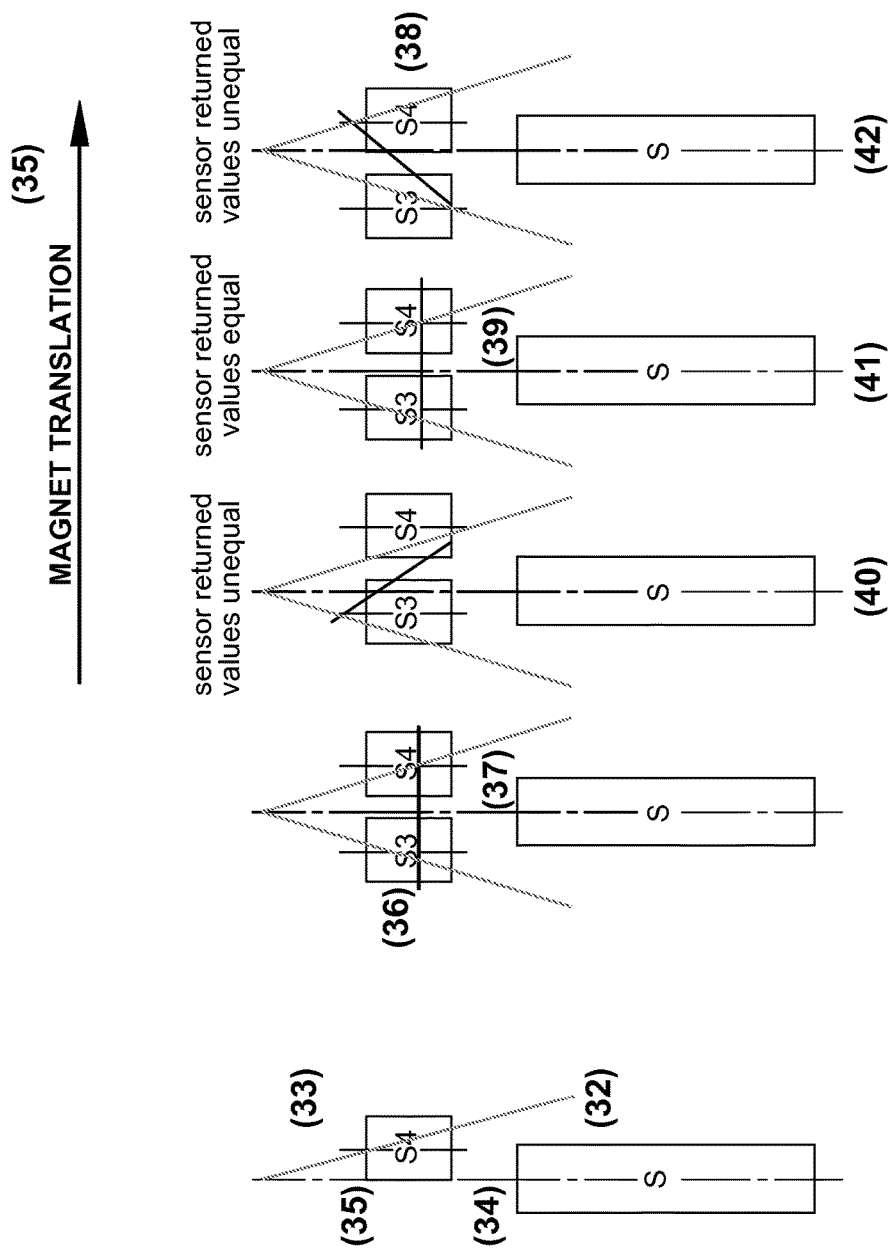
Figure 5B:
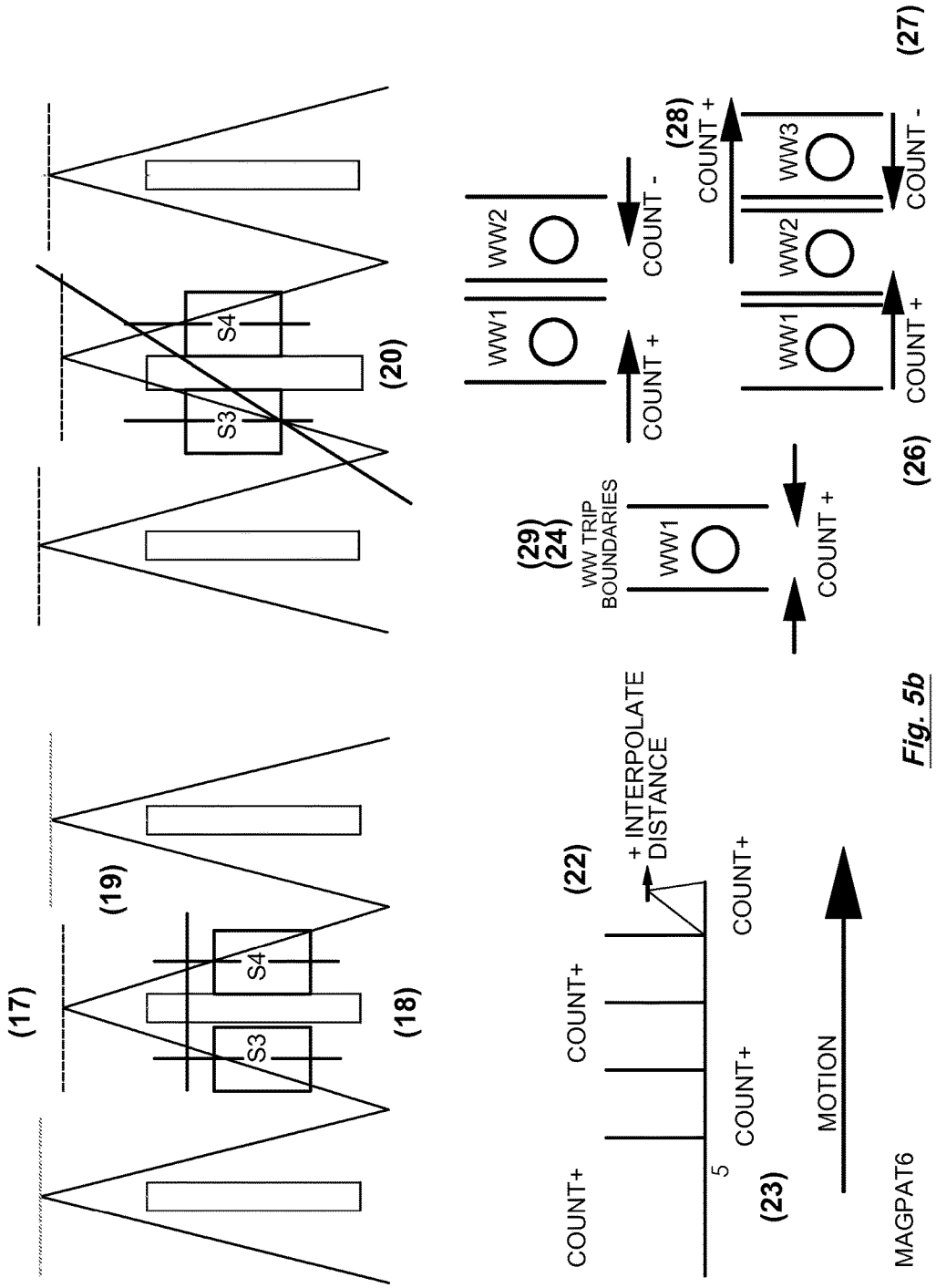
Figure 6A:
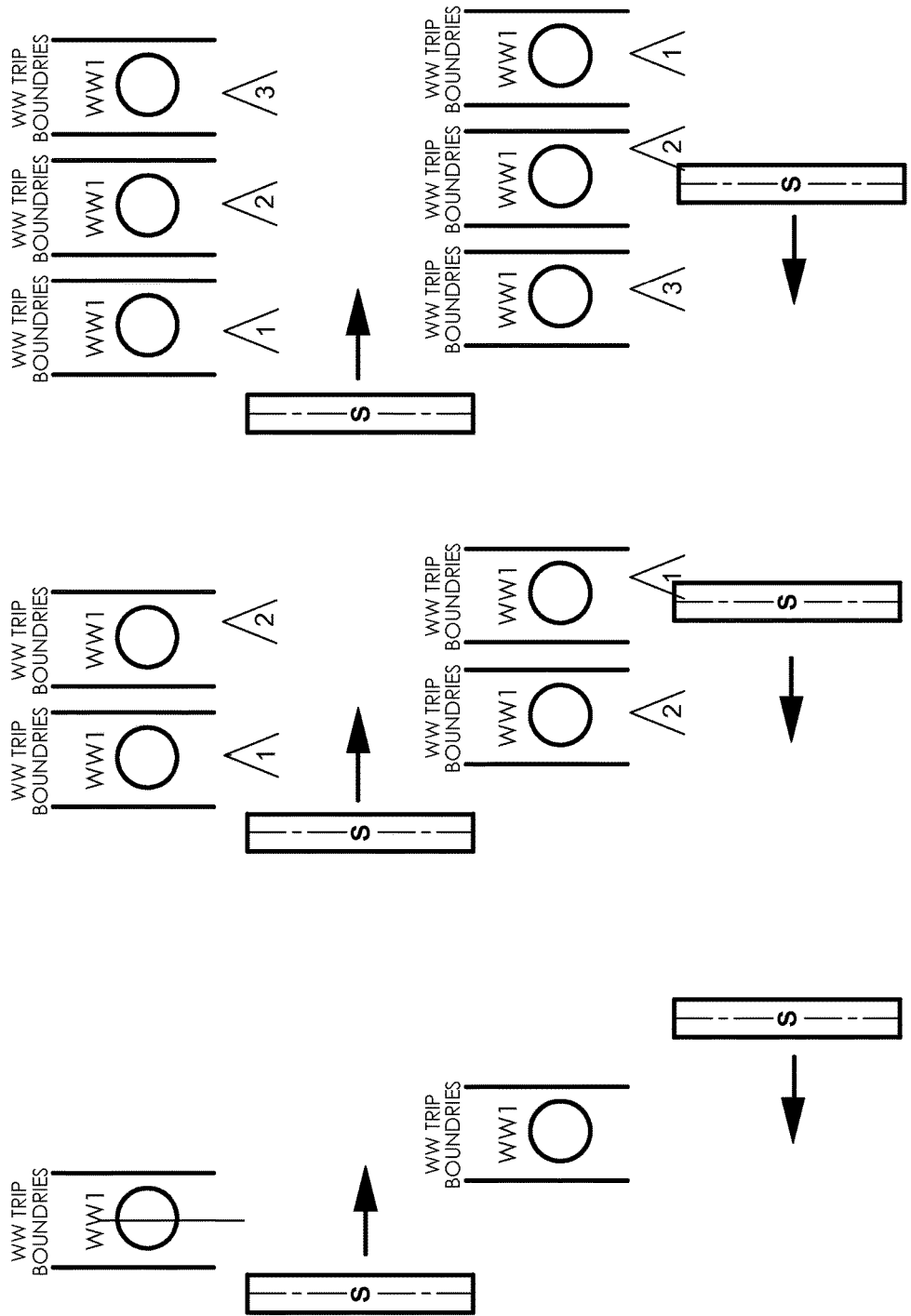
Figure 6B:
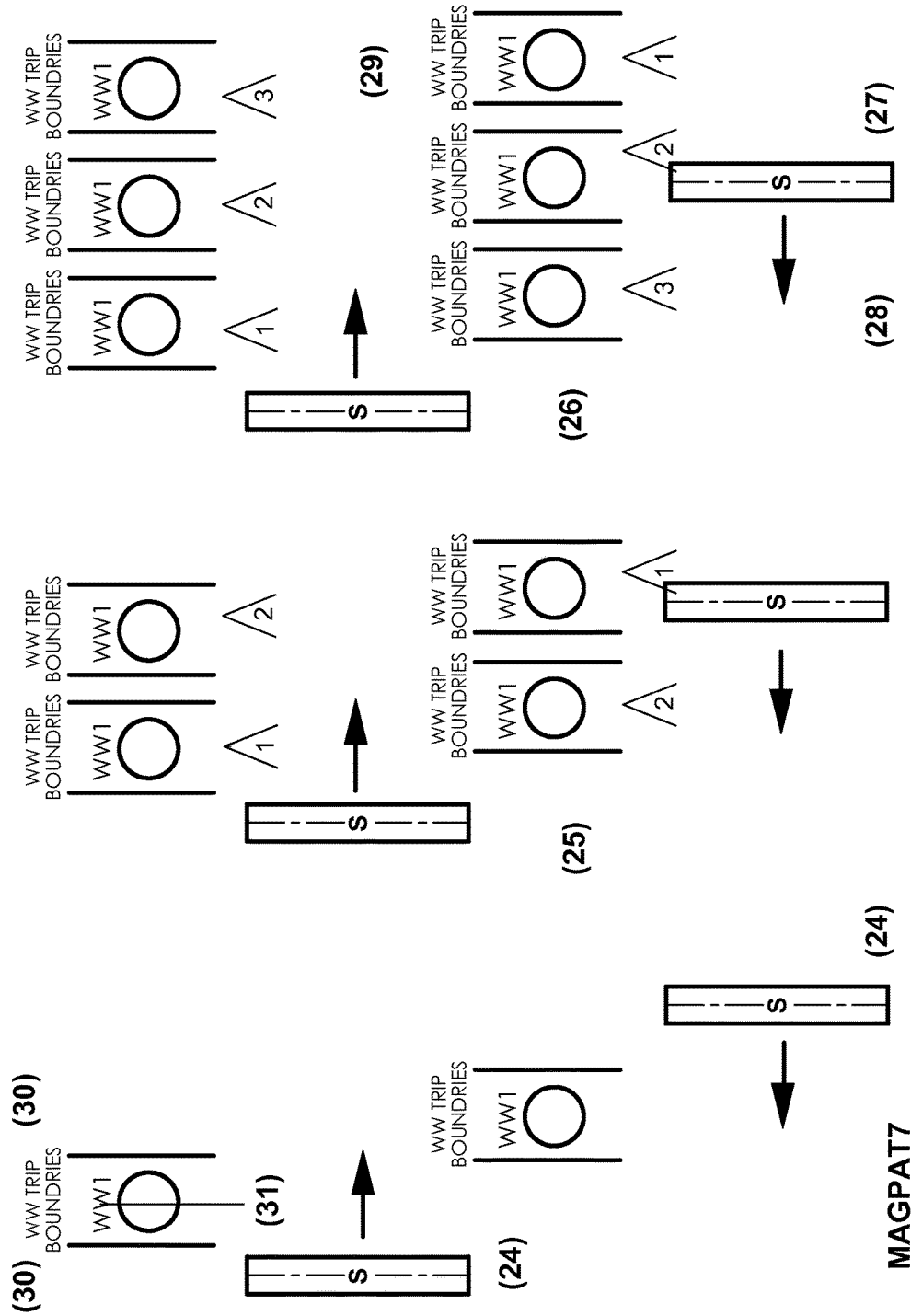
Figure 7A:
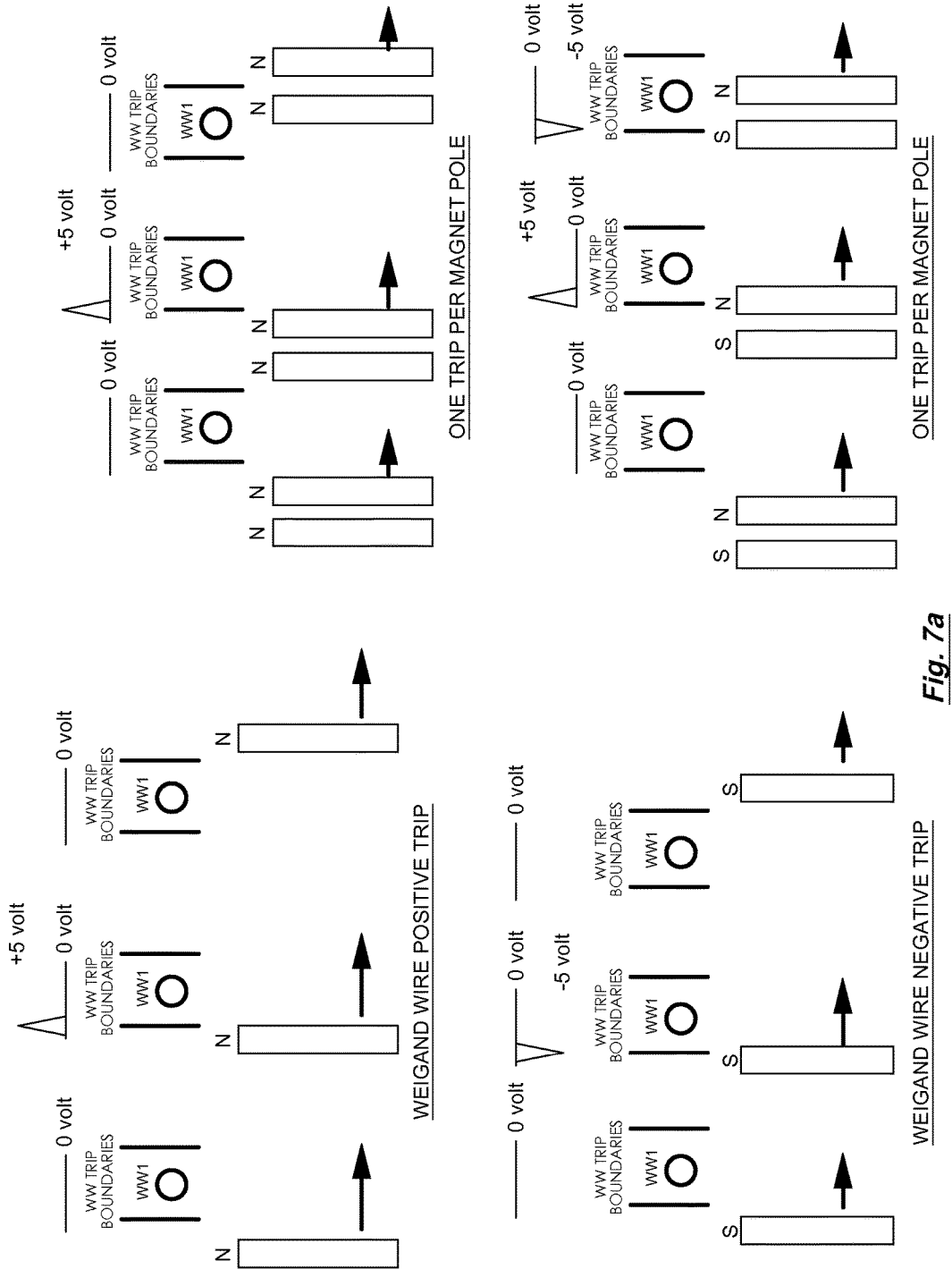
Figure 7B:
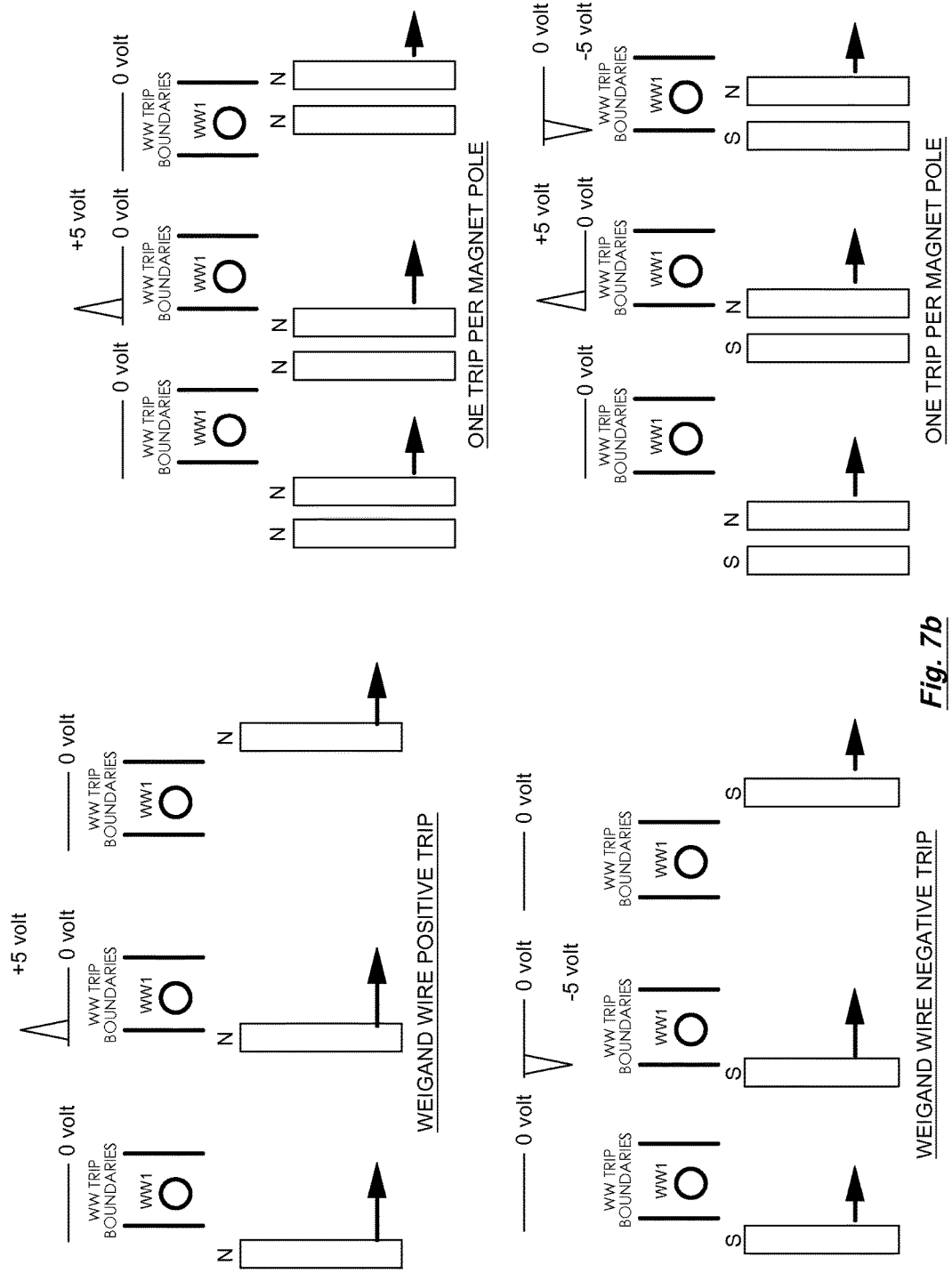
Figure 8A:
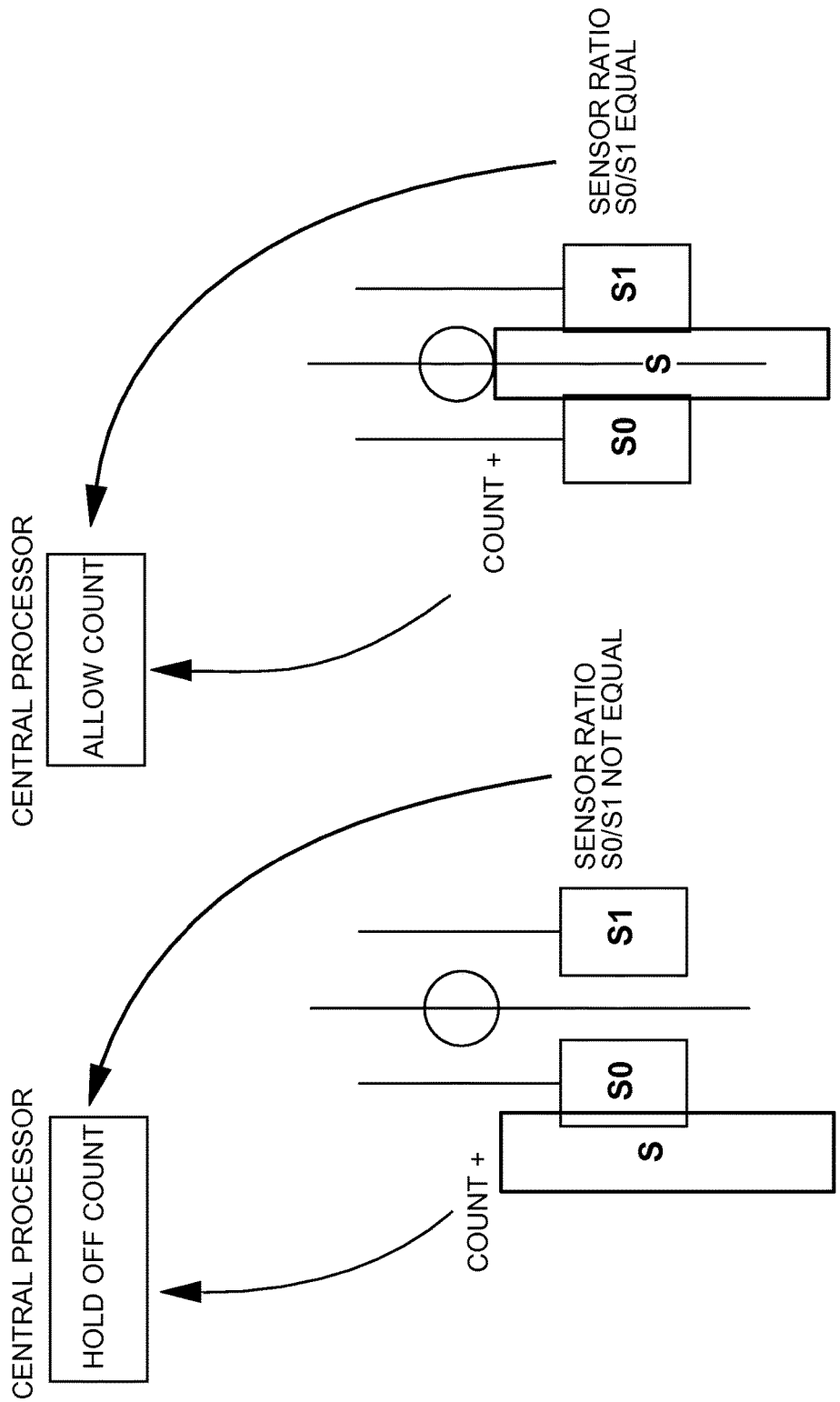
Figure 8B:
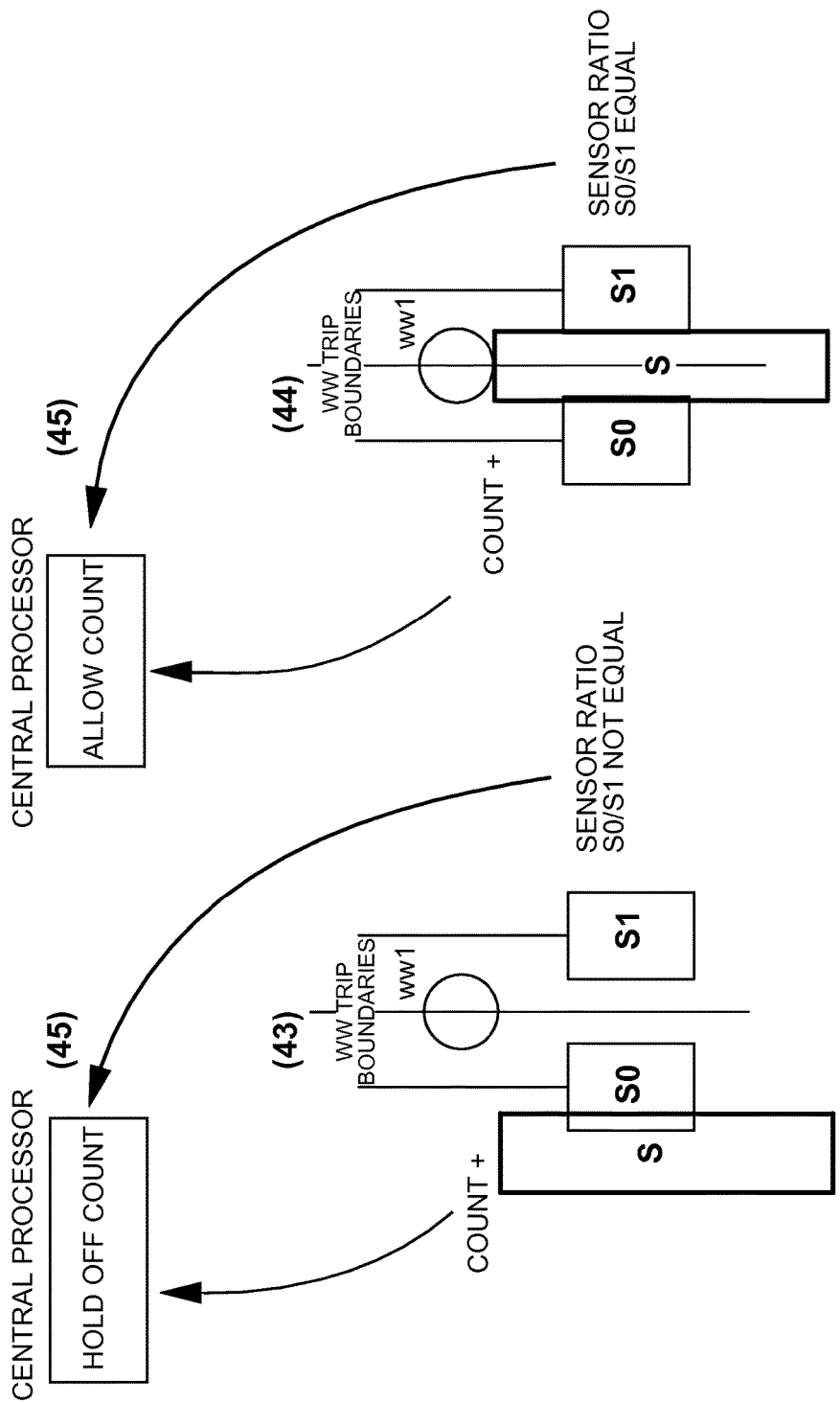
Figure 11A:
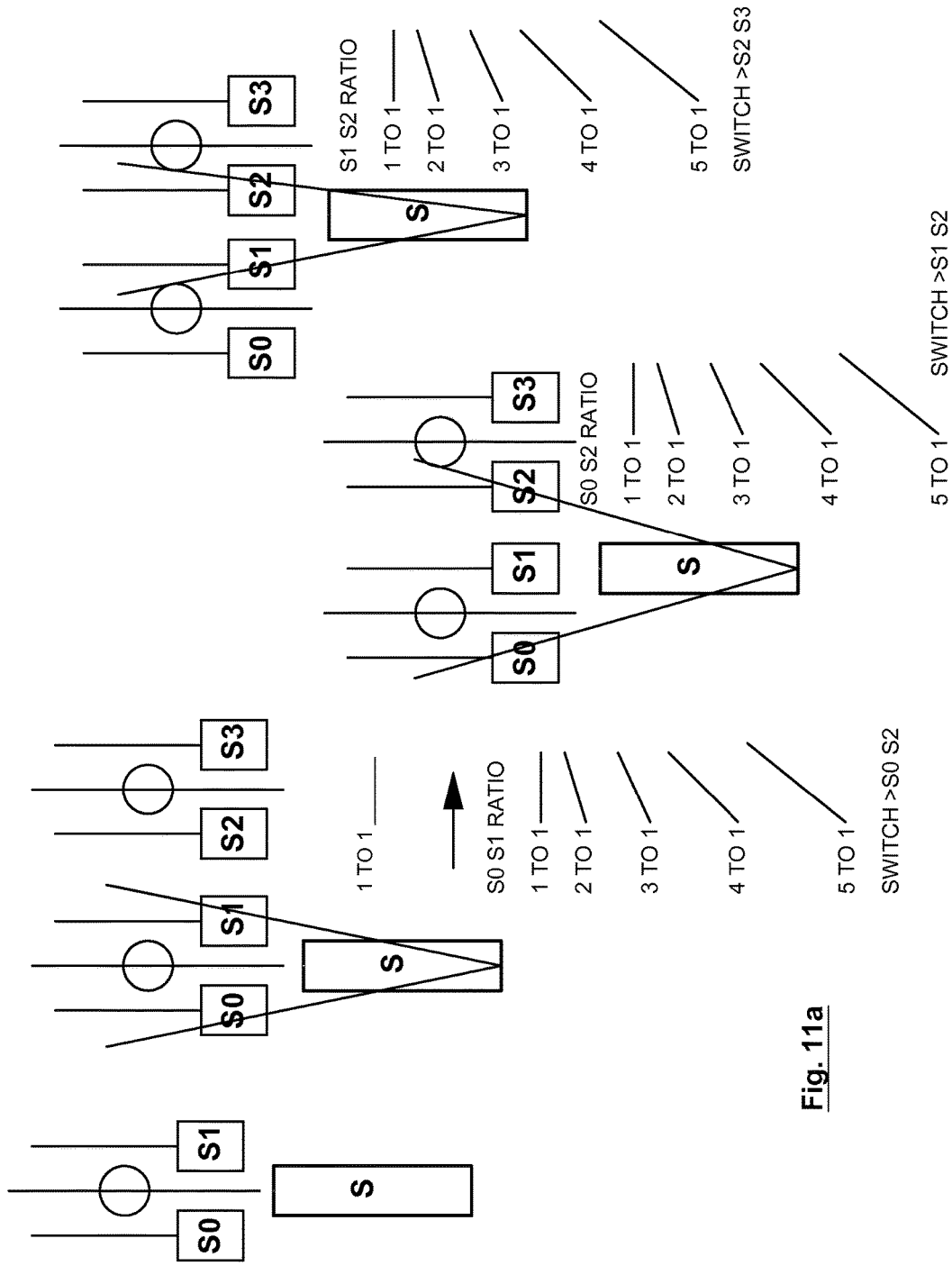
Figure 11B:
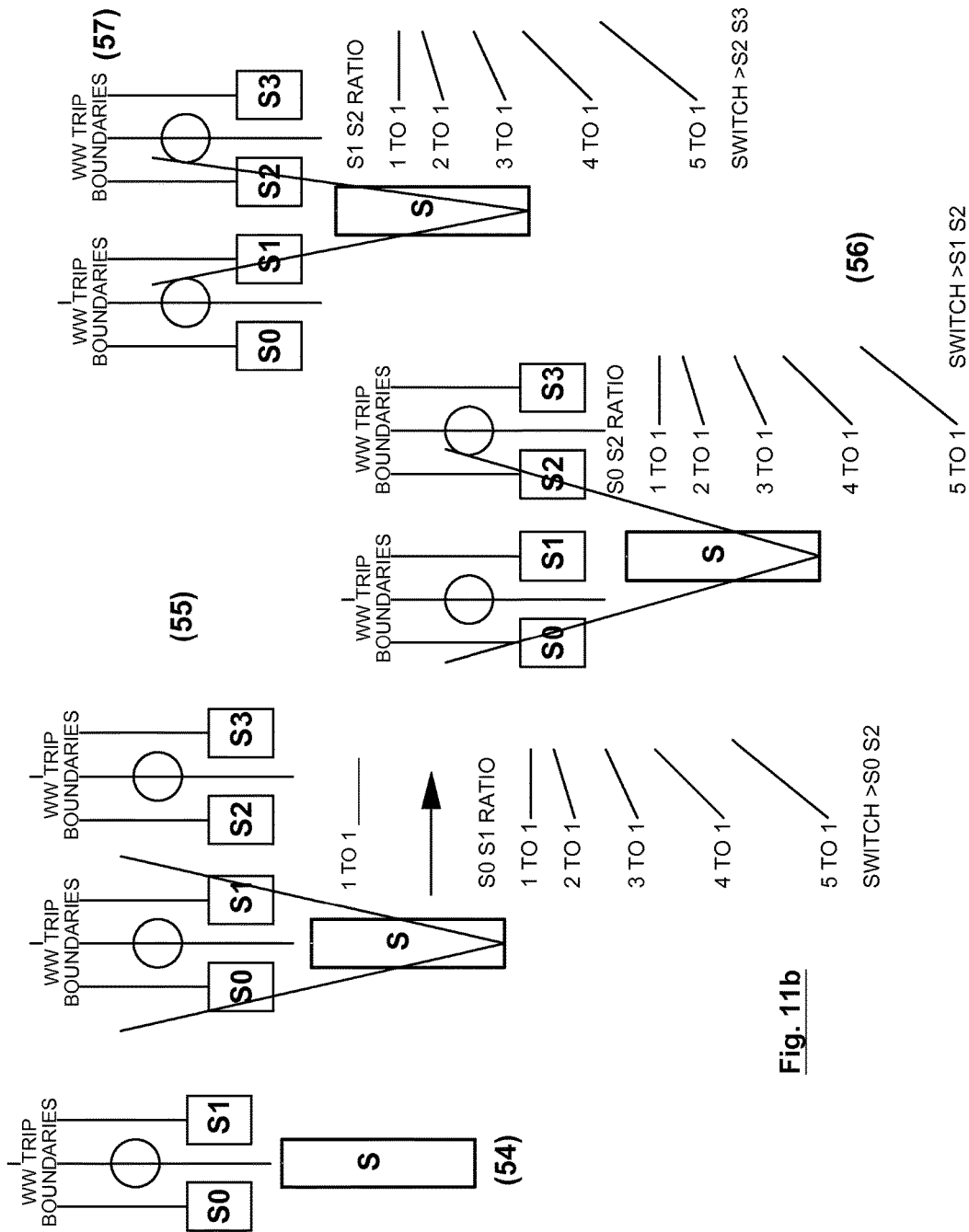
Figure 12:
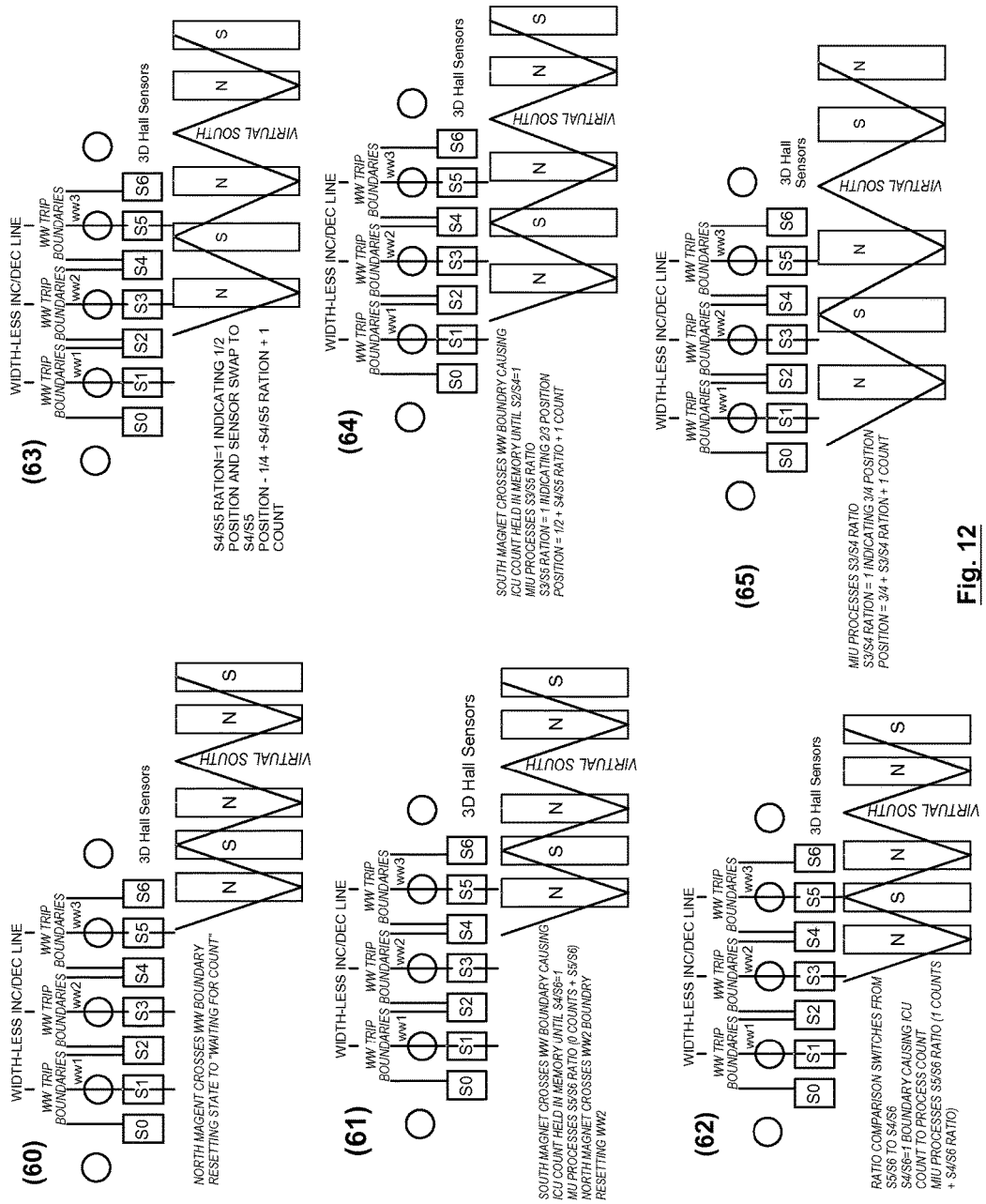
Figure 13:
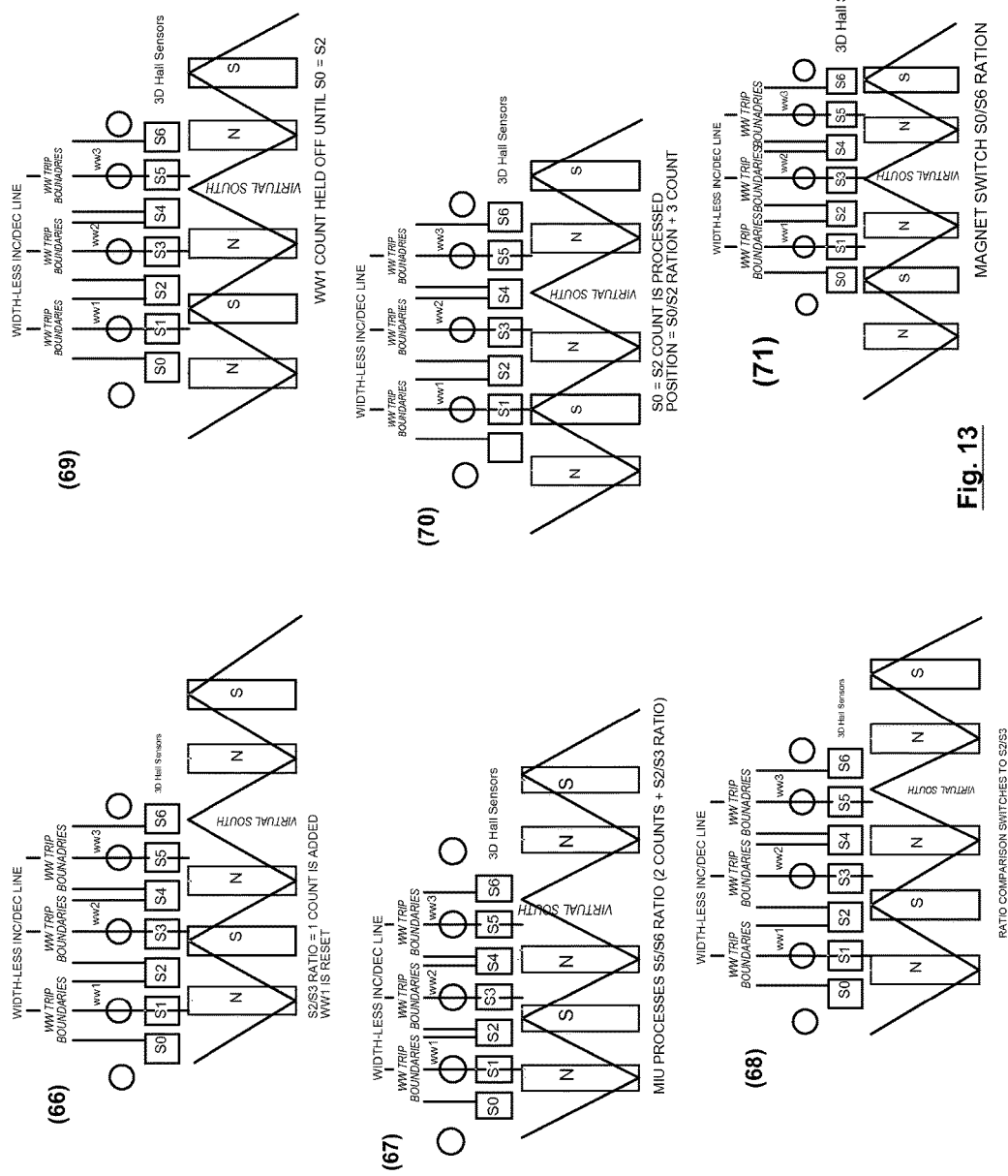
Figure 14:
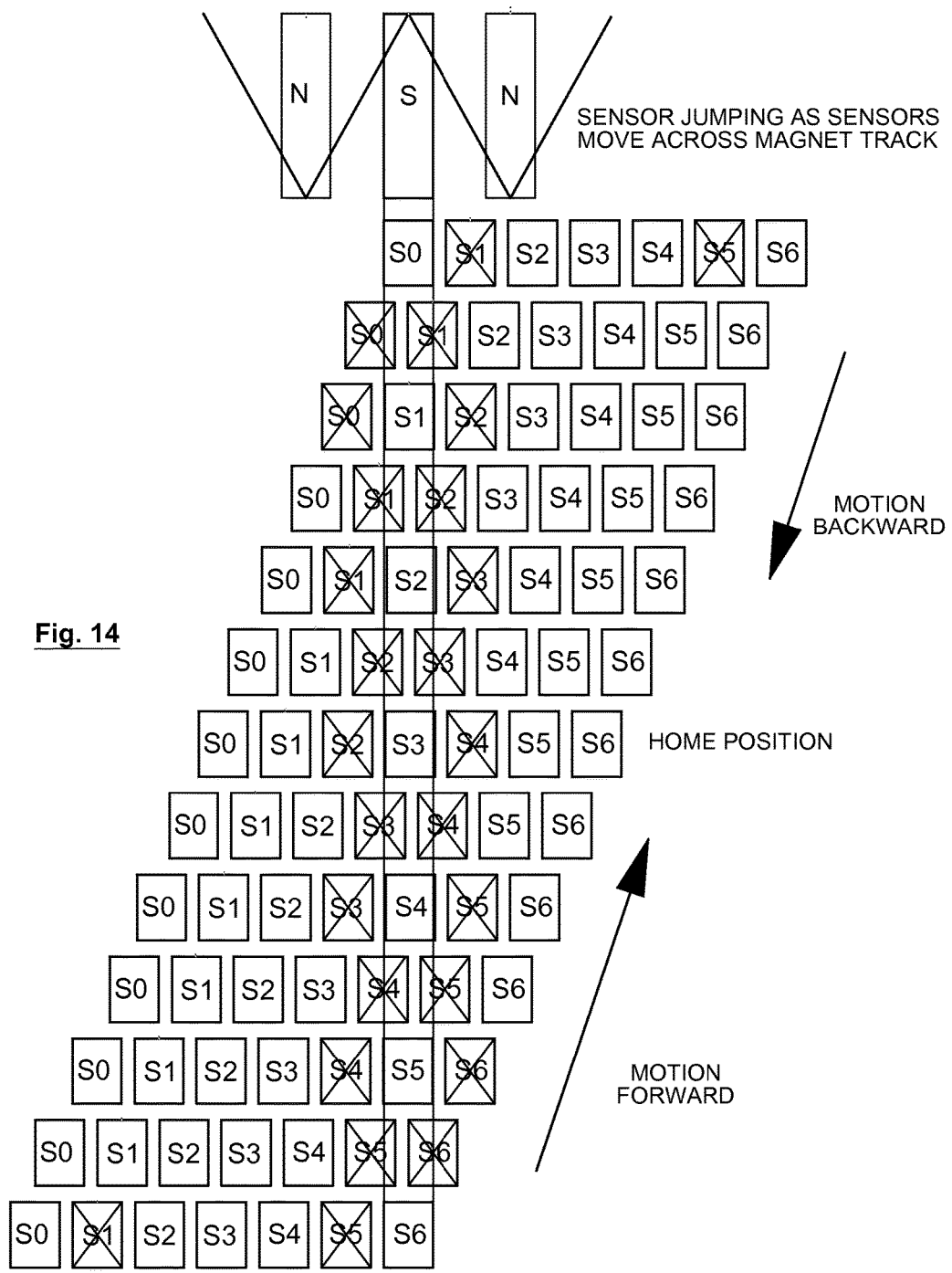
Figure 15:
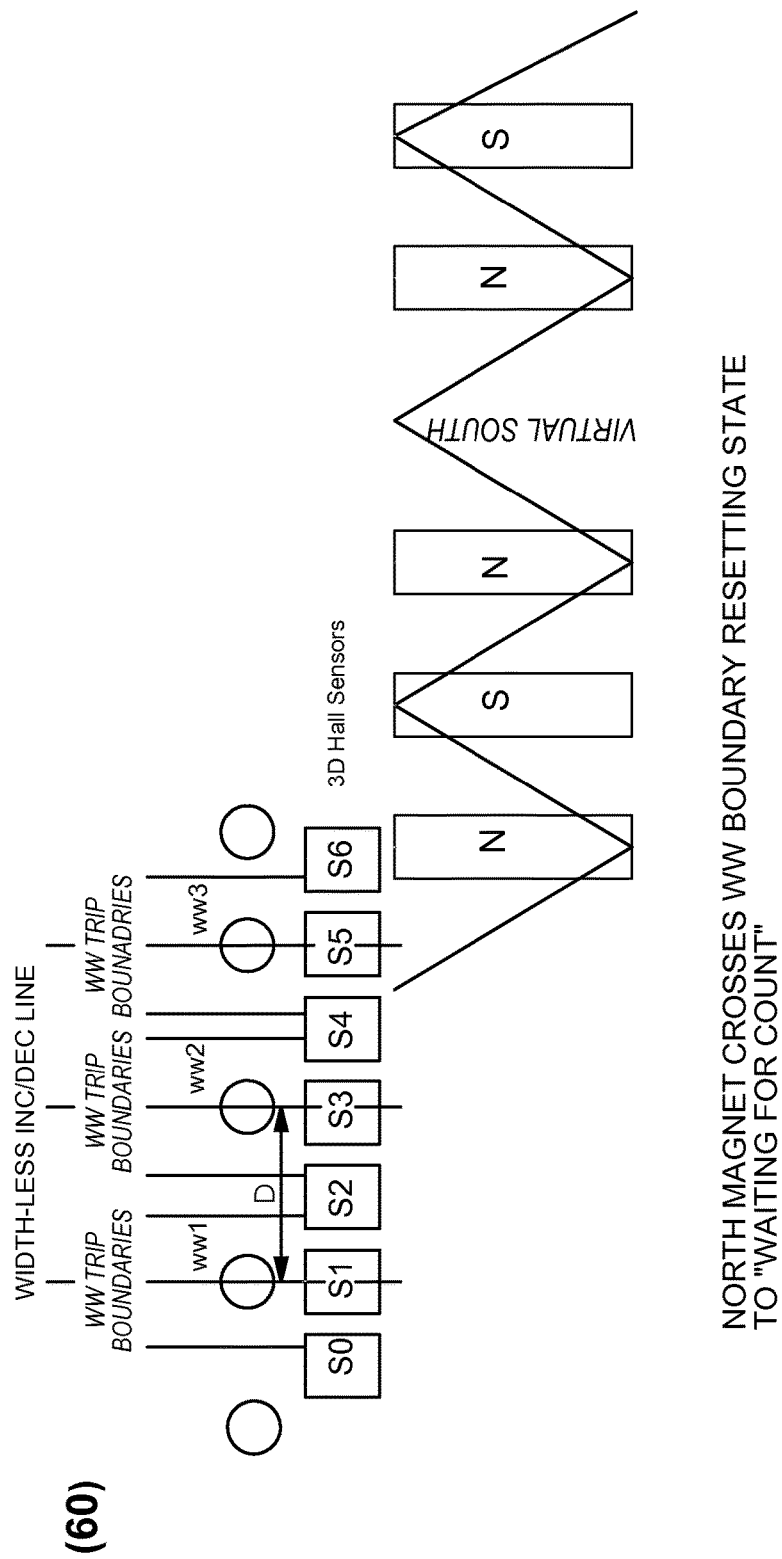
Figure 16:
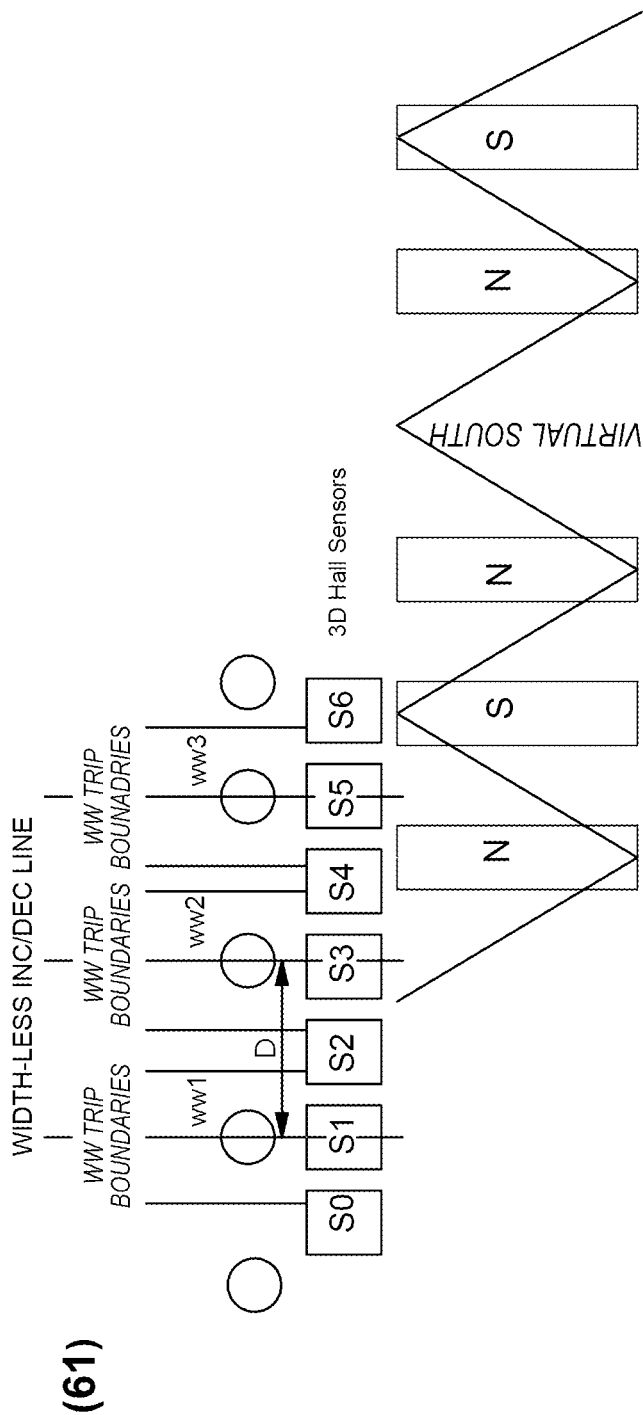
Figure 17:
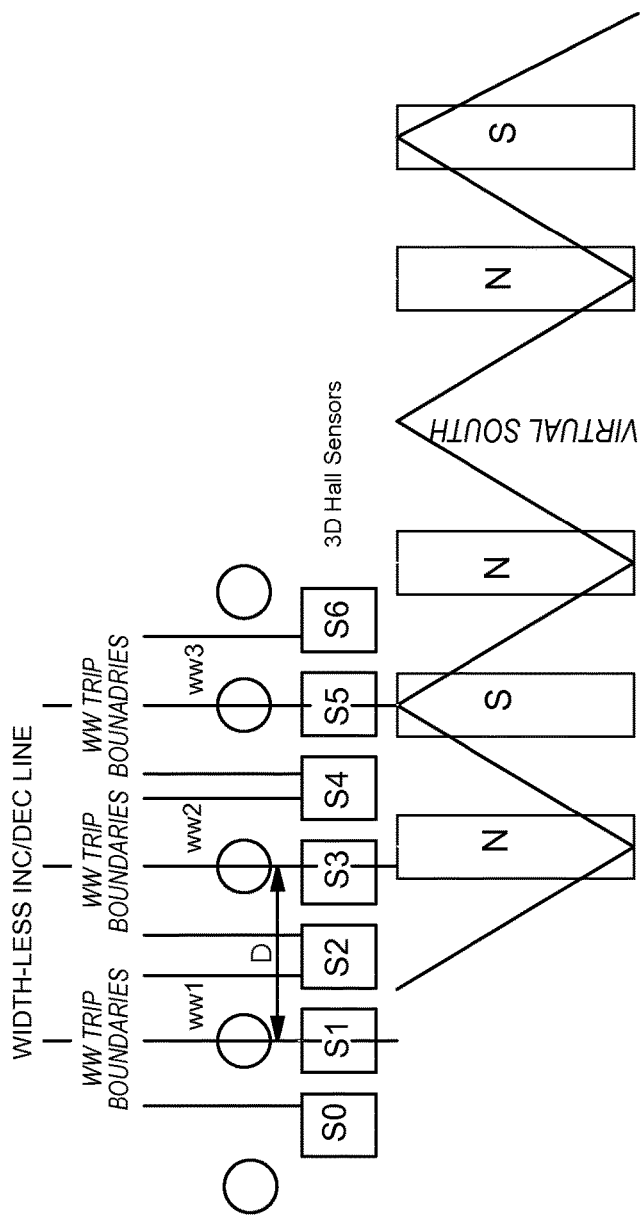
Figure 18:
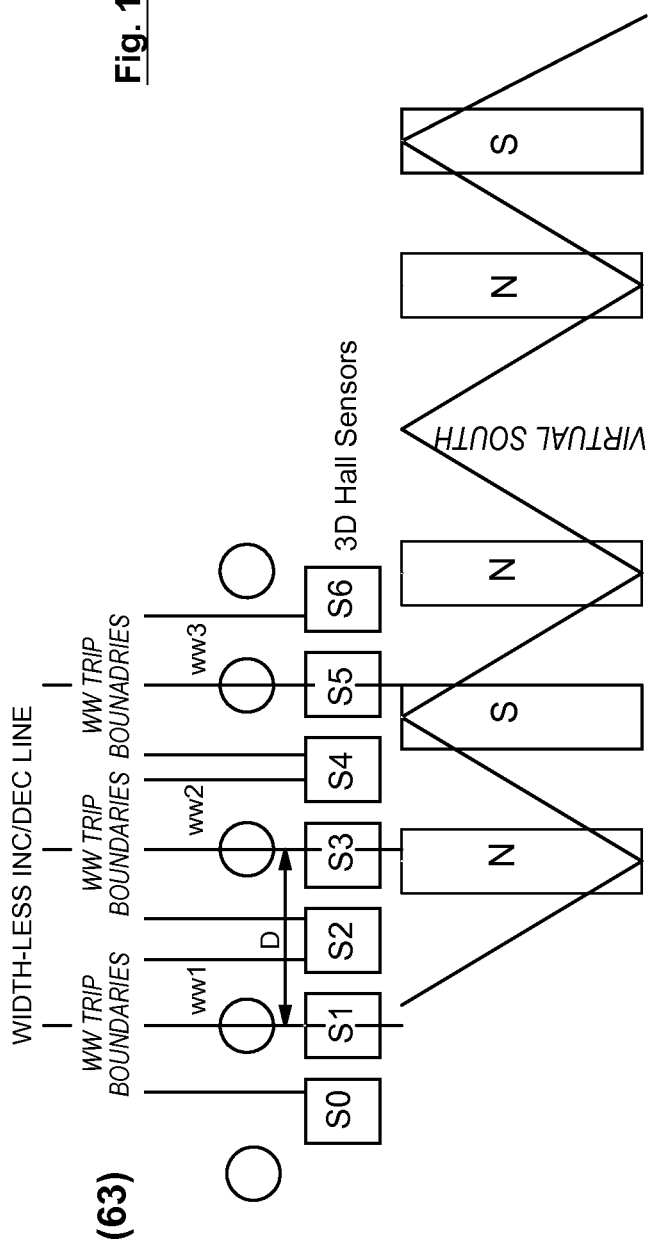
Figure 19:
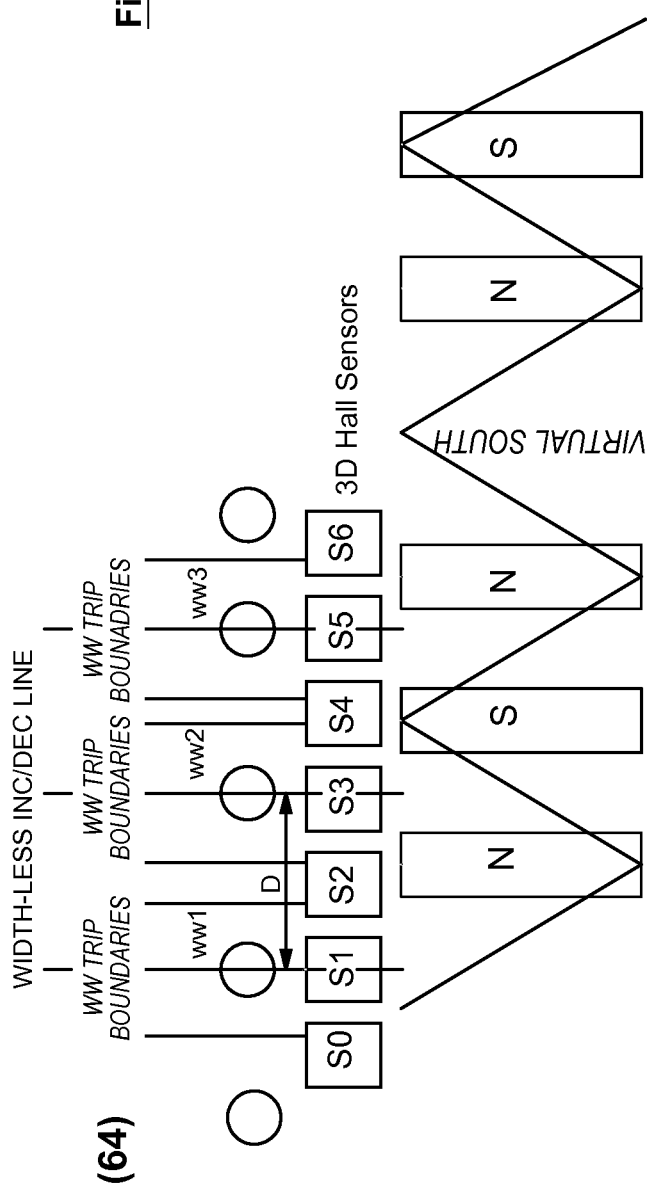
Figure 20:
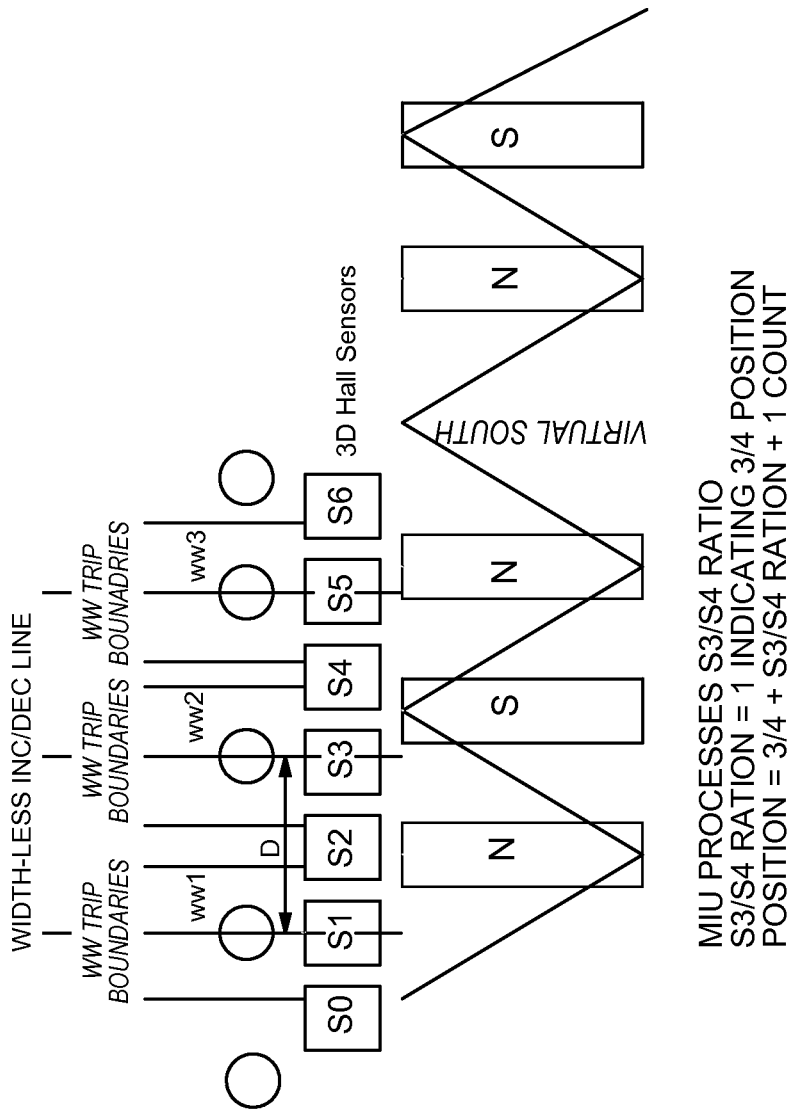
Figure 21:
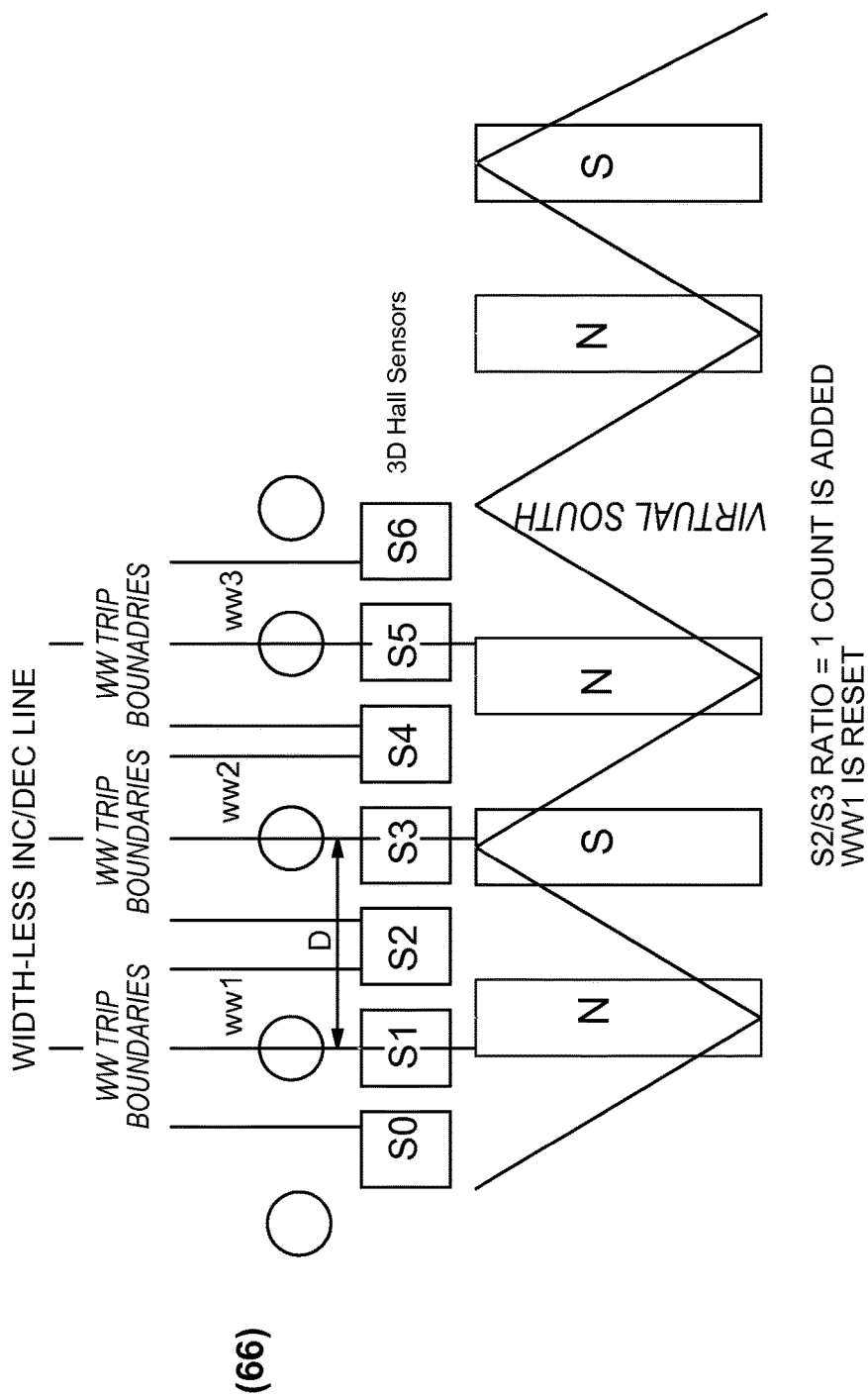
Figure 22:
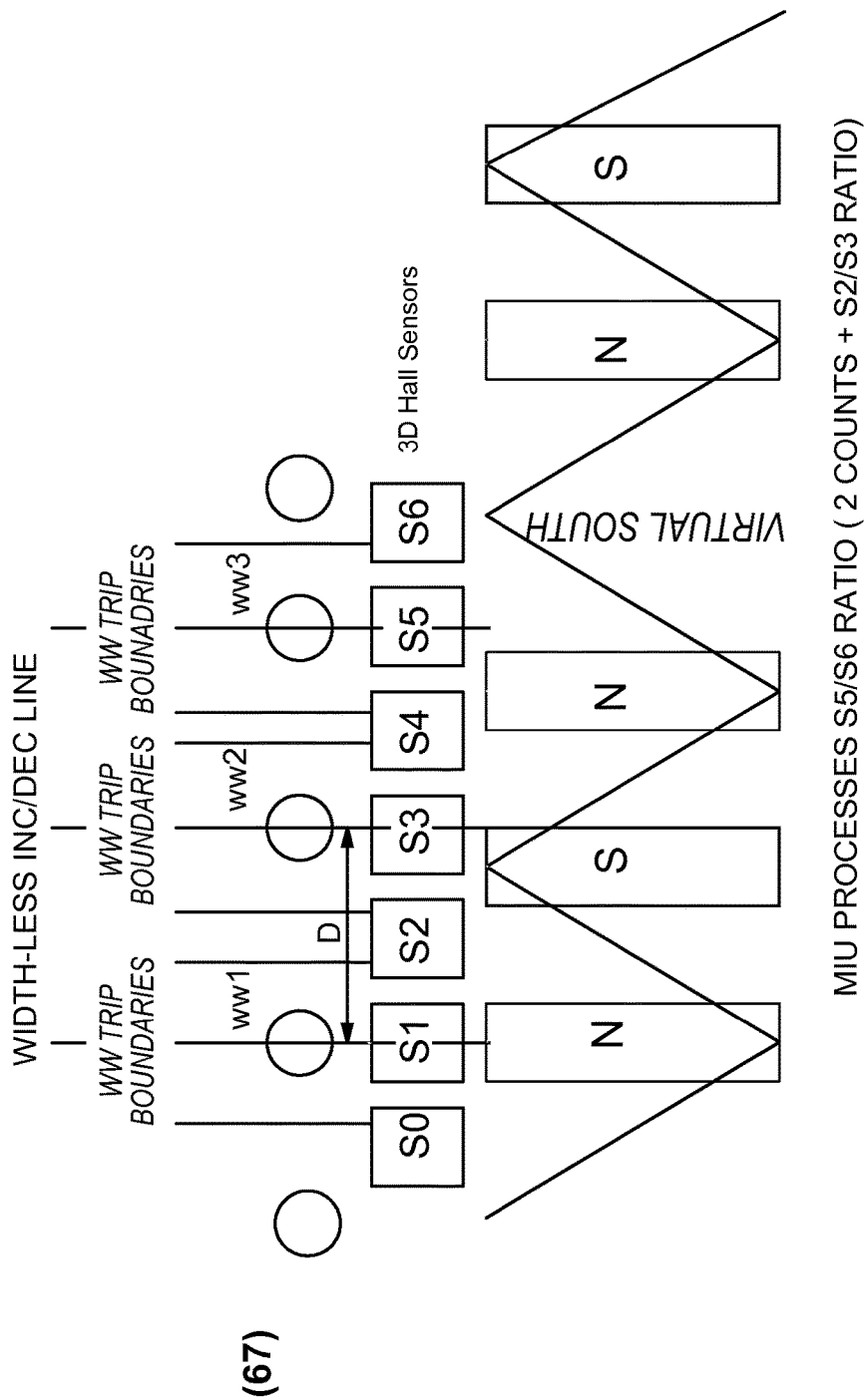
Figure 23:
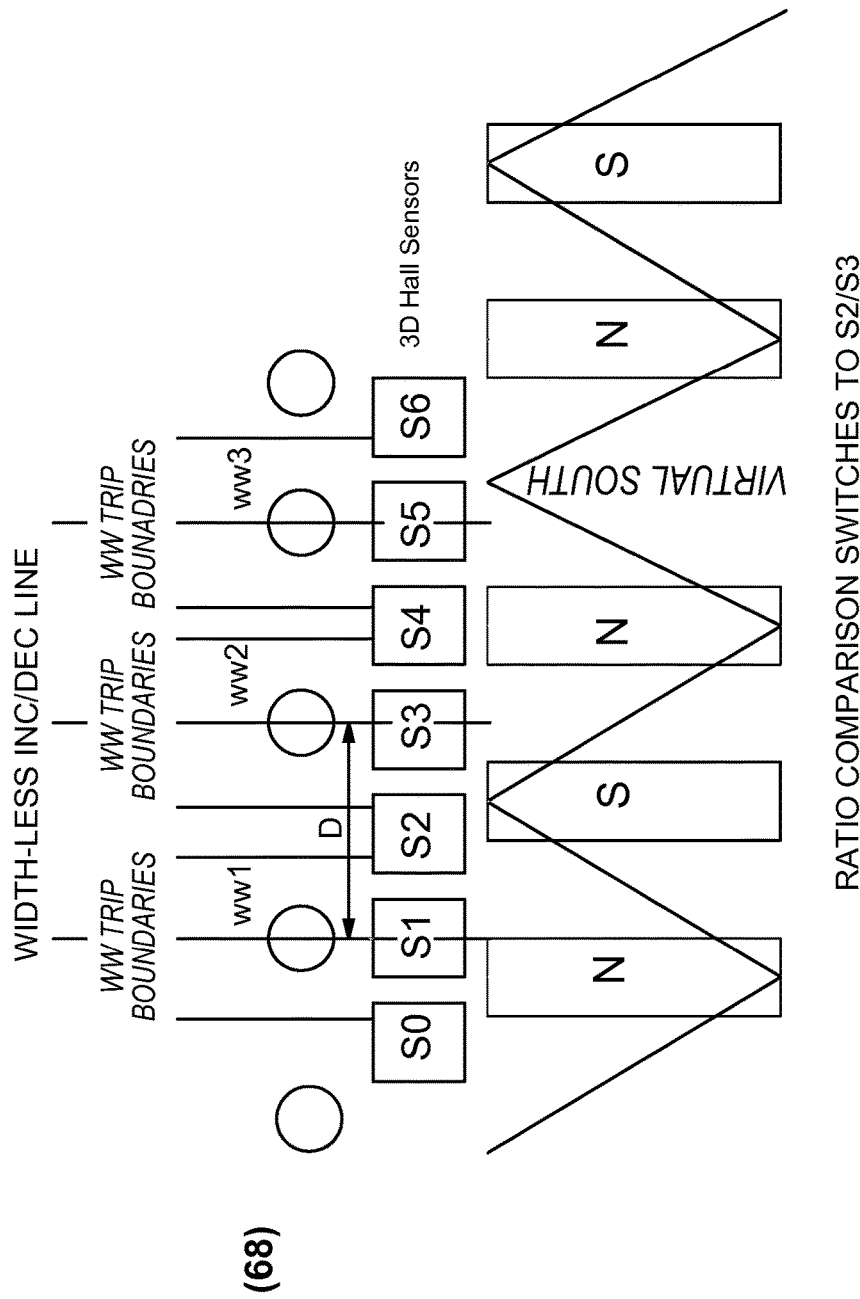
Figure 24:
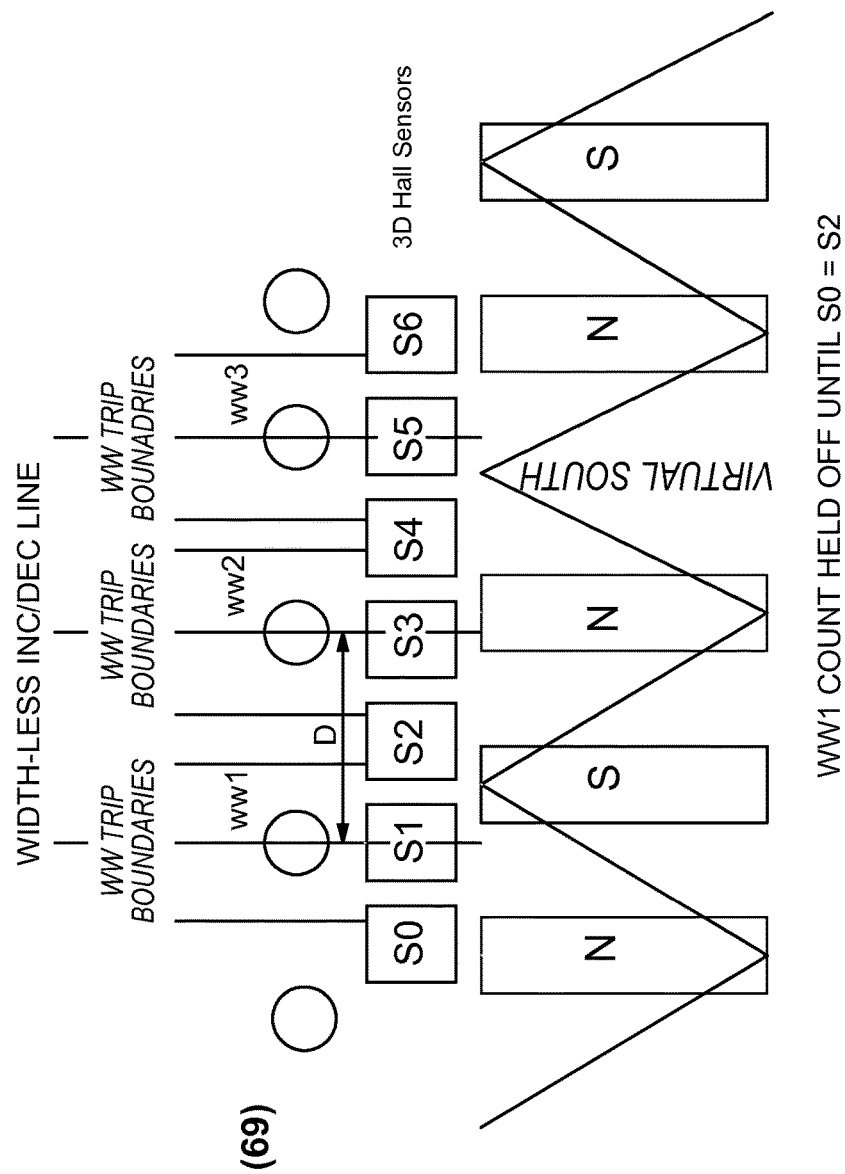
Figure 25:
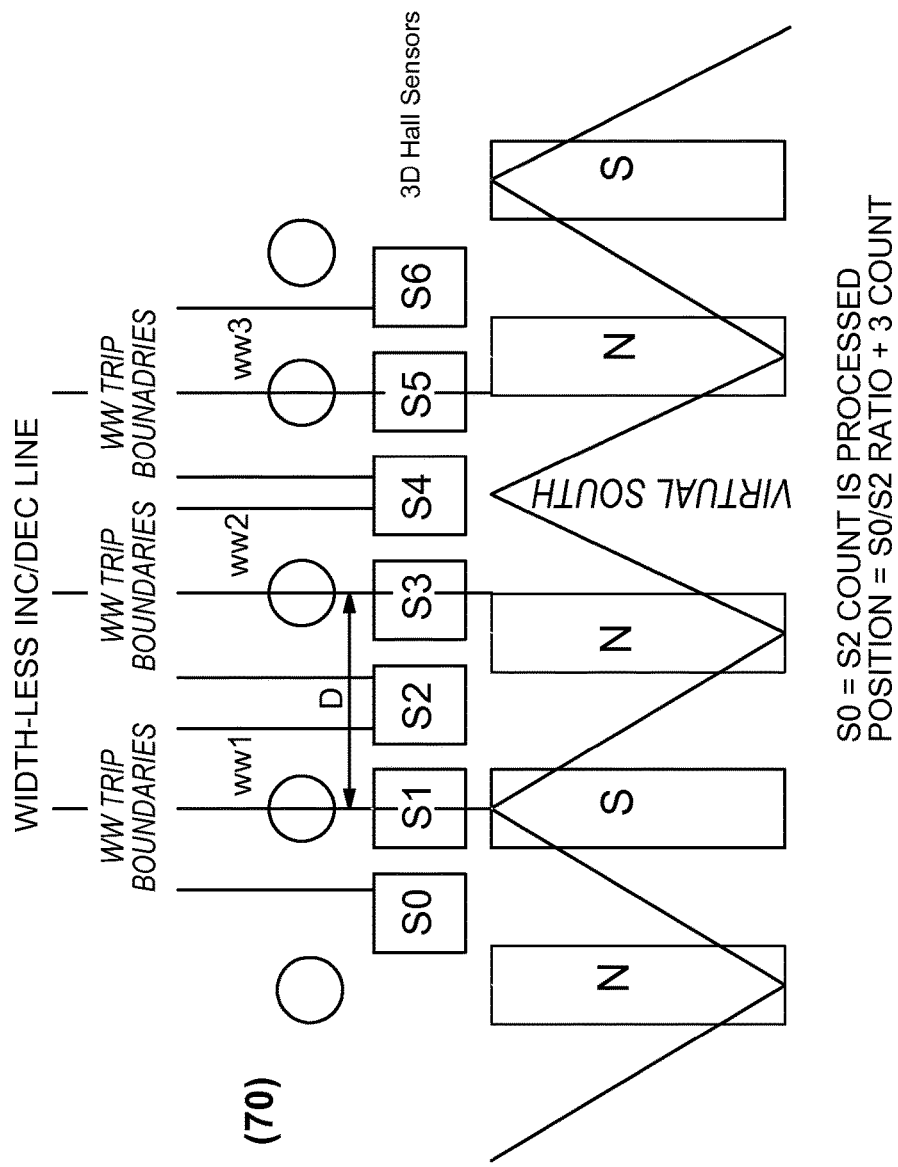
Figure 26:
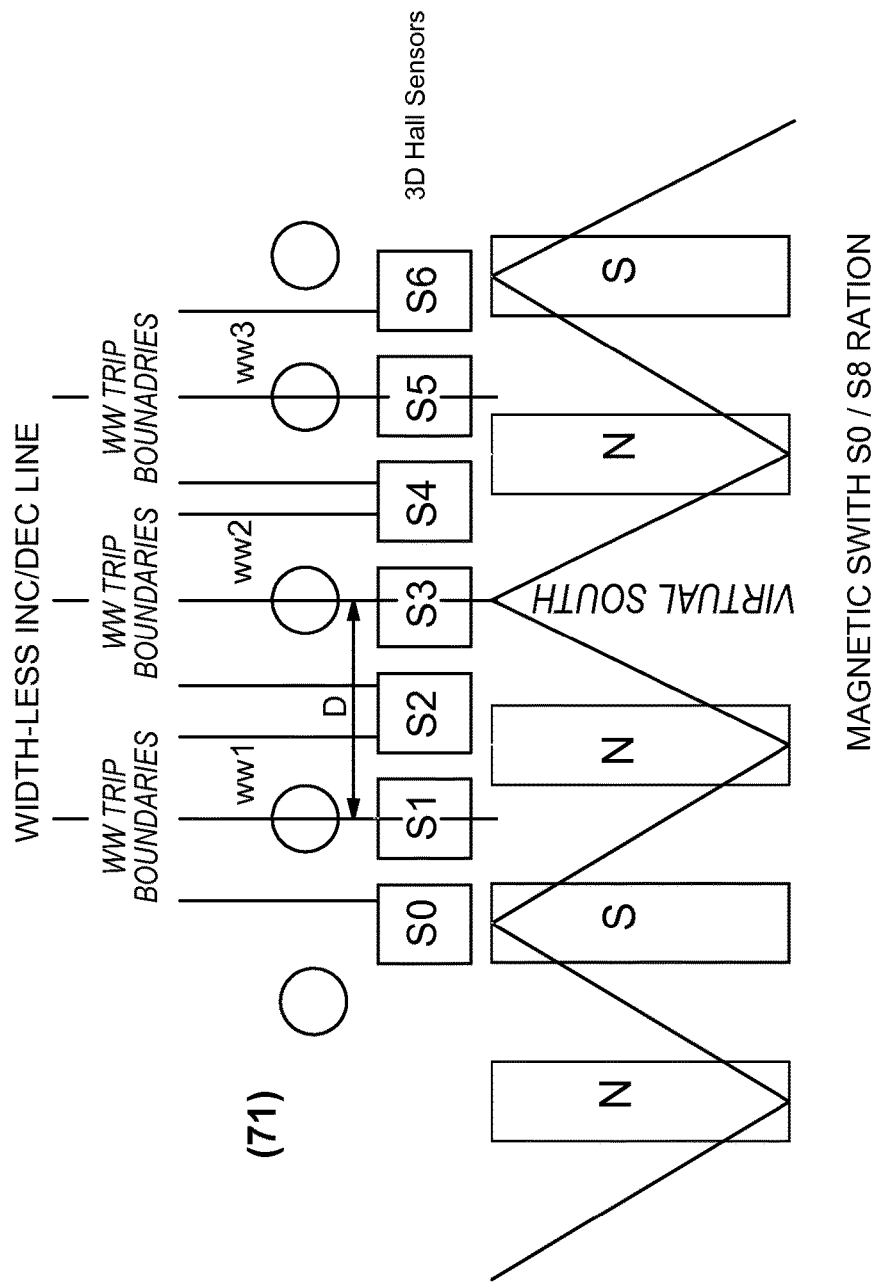

FIGS. 5A and 5B are schematic diagrams illustrating a plurality (18) and (20) of fine position resolution determining conditions illustrating use of a method of interpolating magnetic field signals and/or flux received from a pair of spaced apart Hall effect sensors disposed adjacent and preferably straddling a magnet of a positional signal emitting arrangement equipped with spaced apart positional signal emitter magnets;

FIGS. 6A and 6B are schematic diagrams illustrating several incremental counting unit or subsystem conditions illustrating counter increment and decrement examples dependent upon the direction of relative movement between the detector and positional signal emitting arrangement equipped with spaced apart positional signal emitter magnets;

FIGS. 7A and 7B are schematic diagrams illustrating Wiegand wire trip boundaries depicting when a Wiegand wire will pulse in relation to relative proximity of location to the magnet or magnets tripping the Wiegand wire;

FIGS. 8A and 8B are a pair of schematic diagrams providing examples of when the incremental counting unit or subsystem should increment the count or hold off incrementing the count depending upon readings from an adjacent pair of hall sensors straddling or bracketing a Wiegand wire being tripped by a magnet that is also sensed by the hall sensors;

FIGS. 9A and 9B illustrate a schematic diagram depicting various conditions under which a counter of the incremental counting unit or subsystem is incremented or decremented depending upon the position of a Wiegand wire triggering magnet relative to the pair of hall sensors S0, S1 disposed adjacent the Wiegand wire that preferably bracket or straddle the Wiegand wire;

FIGS. 9A and 9B further illustrate conditions under which incrementing and decrementing of the counter occurs resulting from back and forth relative movement between the detector and the positional signal emitting arrangement equipped with spaced apart positional signal emitter magnets;

FIGS. 10A and 10B illustrate a schematic diagram depicting accumulation of incremented and decremented counts when there is back-and-forth relative movement between the detector and the positional signal emitting arrangement equipped with spaced apart positional signal emitter magnets;

FIGS. 11A and 11B illustrate operation of a fine resolution position subsystem that preferably is or includes a magnetic, e.g. magnetic flux, interpolation unit or subsystem depicting use and operation of the magnetic interpolation unit including in resolving and preferably correcting positional signal emitting arrangement, e.g., track extension, error(s);

FIGS. 12 and 13 illustrate twelve different absolute position sensor operating conditions;

FIG. 14 illustrates "sensor jumping" that can occur during relative movement between the detector and positional signal emitting arrangement equipped with spaced apart positional signal emitter magnets, e.g., magnet track, as at least a plurality of hall sensors move across the magnet track depicting sensor jumping that occurs during relative motion backward towards a home position as well as during relative motion forward towards the home position;

FIG. 15 is a first one of the absolute position sensor operating conditions illustrated in FIG. 12 depicting position sensor operation when a North magnet (or north pole of the crossing magnet) crosses a Wiegand wire boundary that resets the state of the Wiegand wire to a state where the Wiegand wire is waiting to output a pulse or count upon crossing a South magnet (or south pole of the crossing magnet);

FIG. 16 is a second one of the absolute position sensor operating conditions illustrated in FIG. 12 depicting position sensor operation when a South magnet (or south pole of the crossing magnet) crosses one edge of a Wiegand wire trip boundary causing the incremental counting unit or subsystem to increment its count;

FIG. 17 is a third one of the absolute position sensor operating conditions illustrated in FIG. 12 depicting position sensor operation when a ratio comparison of the ratio of the analog signals of S5/S6 with the ratio of the analog signals of S4/S6 is performed during magnetic interpolation unit operation to determine if and when to increment the count of the incremental counting unit or subsystem;

FIG. 18 is a fourth one of the absolute position sensor operating conditions illustrated in FIG. 12 depicting position sensor operation depicting when a ratio comparison of S4/S5 determines when to switch to the S4/S5 position in determining whether the S4/S5 ratio has met a threshold requiring incrementing of the count of the incremental counting unit or subsystem;

FIG. 19 is a fifth one of the absolute position sensor operating conditions illustrated in FIG. 12 depicting position sensor operation when a South magnet crosses a Wiegand wire boundary causing the incremental counting unit or subsystem to indicate a count is forthcoming but hold off actual incrementing of the count until the ratio of S2/S4 reaches or exceeds a predetermined threshold, preferably unity or 1;

FIG. 20 is a first one of the absolute position sensor operating conditions illustrated in FIG. 13 depicting position sensor operation when an examination of the ratio, S3/S4, between the analog signals being outputted by sensor, S3, and sensor, S4, satisfies conditions required to change the count of the incremental counting unit or subsystem;

FIG. 21 is a second one of the absolute position sensor operating conditions illustrated in FIG. 13 depicting position sensor operation when an examination of the ratio, S2/S3, between the analog signals being outputted by sensor, S2, and sensor, S3, satisfies conditions required to change the count of the incremental counting unit or subsystem;

FIG. 22 is a third one of the absolute position sensor operating conditions illustrated in FIG. 13 depicting position sensor operation when an examination of the ratio, S5/S6, between the analog signals being outputted by sensor, S5, and sensor, S6, satisfies conditions required to change the count of the incremental counting unit or subsystem;

FIG. 23 is a fourth one of the absolute position sensor operating conditions illustrated in FIG. 13 depicting position sensor operation during comparison of ratio, S2/S3, in determining whether to switch to a different pair of sensors used in making a sensor ratio or sensor comparison in analyzing whether to change the count of the incremental counting unit or subsystem;

FIG. 24 is a fifth one of the absolute position sensor operating conditions illustrated in FIG. 13 depicting position sensor operation when operating conditions require changing the count of the incremental counting unit or subsystem when a Wiegand wire, WW1, has been triggered by a magnet only when the analog signal being outputted by Hall sensor, S0, from the same magnet is equal to the analog signal being outputted by Hall sensor, S2, from the same magnet;

FIG. 25 is a sixth one of the absolute position sensor operating conditions illustrated in FIG. 13 depicting position sensor operation during operating conditions in accordance with that depicted in FIG. 25; and FIG. 26 is a seventh one of the absolute position sensor operating conditions illustrated in FIG. 13 depicting position sensor operation during operating conditions in accordance with that depicted in FIG. 26.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1A-26 illustrate a preferred embodiment of an absolute position sensor 80 of the present invention that includes a positional signal emitting arrangement 82 and a position determining system 84 having a proximity sensing detector 86 that reads signals from at least a plurality of pairs, i.e., at least three, of spaced apart positional signal emitters 88a, 88b, 88c, 88d, 88e, 88f, 88g, 88h, 88i of the positional signal emitting arrangement 82 during relative movement between the detector 86 and the positional signal emitting arrangement 82 in determining position information pertaining to a change of relative position therebetween. The detector 86 has a counting signal detector 87 or coarse position signal detector 89 that can be in the form of a counting signal detector array 90 that includes a plurality of pairs, i.e., at least three, of spaced apart counting signal detecting sensors 92a, 92b, 92c that forms part of an incremental counting subsystem 94 with the counting signal detecting sensors 92a, 92b, 92c used to digitally detect the presence or absence of a signal 96 emitted from an adjacent one of a plurality of spaced apart positional signal emitters 88a, 88b, 88c, 88d, 88e, 88f, 88g, 88h, 88i as an adjacent one of the positional signal emitters, e.g., signal emitter 88d, 88e and/or 88f, passes by during relative movement enabling each detected signal 96 to be used in accumulation of an incremental distance traveled between adjacent pairs, i.e., 88a & 88b, 88b & 88c, 88c & 88d, 88d & 88e, 88e & 88f, 88f & 88g, 88g & 88h, and/or 88h & 88i, of the positional signal emitters 88a, 88b, 88c, 88d, 88e, 88f, 88g, 88h, 88i of the positional signal emitting arrangement 82. The detector 86 also has a fine position signal detector 98 that can be in the form of a fine position signal detecting array 100 that includes a plurality of pairs, i.e., at least three, of spaced apart fine position signal strength or flux detecting sensors 102a or S0, 102b or S1, 102c or S2, 102d or S3, 102e or S4, 102f or S5, 102g or S6, which forms part of a fine position resolution system 104 with signal strength or flux detecting sensors 102a, 102b, 102c, 102d, 102e, 102f and/or 102g used to measure signal strength between at least one adjacent pair of positional signal emitters, i.e., 88a & 88b, 88b & 88c, 88c & 88d, 88d & 88e, 88e & 88f, 88f & 88g, 88g & 88h, and/or 88h & 88i, which is interpolated using a processor 106 onboard the position sensor 80 to relatively precisely determine a position of the detector 86 relative to the positional signal emitting arrangement 82.

In use, the detector 86 is mounted to one part of a machine or apparatus (not shown) that uses position information from the position determining system 84 during machine or apparatus operation and the positional signal emitting arrangement 82 is mounted to another part of the machine or apparatus that moves relative to the one part of the machine or apparatus during machine or apparatus operation. In typical use, the detector 86 is mounted to a fixed or stationary part of the machine or apparatus and the positional signal emitting arrangement 82 is mounted to a movable part of the machine or apparatus that moves relative to the fixed or stationary part of the machine or apparatus during machine or apparatus operation such that the positional signal emitting arrangement 82 moves relative to the detector 86 during machine or apparatus operation. If desired, the positional signal emitting arrangement 82 can be mounted to the fixed or stationary part of the machine or apparatus and the detector 86 can be mounted to the movable part of the machine or apparatus such that the detector 86 moves relative to the positional signal emitting arrangement 82 during machine or apparatus operation.

The position determining system 84 includes at least one processor 106, preferably in the form of a microcontroller, microprocessor, field programmable gate array or the like, which is configured, such as in firmware and/or software, (a) to accumulate counts and/or incremental distance traveled between adjacent pairs of positional signal emitters as part of the incremental counting subsystem 94, and (b) to perform interpolation as part of the fine position resolution subsystem 95. The firmware and/or software can be stored onboard the processor 106, such as in memory onboard the processor 106, e.g., microcontroller, and/or can be stored in separate memory 108 linked to the processor 106. Processor 106 is disposed onboard the sensor 80 preferably by being disposed onboard the position determining system 84. In a preferred embodiment, the processor 106 is disposed onboard the detector 86 by being mounted on, to or in the detector 86. Where the sensor 80 is equipped with memory 108 separate from the processor 106 and/or in addition to memory onboard the processor 106, e.g., microcontroller, the memory 108 preferably is conventional non-volatile random access memory, such as erasable programmable read only memory (EPROM), electronically erasable programmable read only memory (EEPROM), and/or conventional flash memory, which retains the contents stored in memory even when no electricity or electrical power is present. Where the memory 108 used is in the form of flash memory, e.g. NVRAM, examples of suitable flash memory include floating gate transistor flash memory, NOR flash memory, NAND flash memory, and/or vertical NAND flash memory. Where the sensor 80 is equipped with memory 108 separate from the processor 106 and/or in addition to memory onboard the processor 106, e.g., microcontroller, the memory 108 is disposed onboard the sensor 80 preferably by being disposed onboard the detector 86 by being mounted on, to or in the detector 86. In a preferred embodiment, the processor 106, memory 108, counting signal detecting sensors 92a, 92b, 92c, and fine position signal strength or flux detecting sensors 102a or S0, 102b or S1, 102c or S2, 102d or S3, 102e or S4, 102f or S5, 102g or S6 are all mounted to the same or common detector board 110, e.g., etched or printed circuit board, which can and preferably does form a position detecting head 112 of the detector 86.

By providing a position sensor 80 in accordance with the present invention having an onboard processor 106 configured in firmware and/or software with (a) a method of determining and/or keeping track of the current coarse position at or between one of the adjacent pairs, i.e., the distance between at least a plurality of 88a & 88b, 88b & 88c, 88c & 88d, 88d & 88e, 88e & 88f, 88f & 88g, 88g & 88h, and/or 88h & 88i, of positional signal emitters 88a, 88b, 88c, 88d, 88e, 88f, 88g, 88h, 88i by substantially continuously accumulating counts and/or incremental distance traveled between at least a plurality of adjacent pairs, i.e., the distance between at least a plurality of 88a & 88b, 88b & 88c, 88c & 88d, 88d & 88e, 88e & 88f, 88f & 88g, 88g & 88h, and/or 88h & 88i, of positional signal emitters 88a, 88b, 88c, 88d, 88e, 88f, 88g, 88h, 88i using one or more and preferably a plurality of the counting signal detecting sensors 92a, 92b, 92c of the incremental counting subsystem 94, and (b) a method of determining fine position using at least a plurality of the fine position signal strength or flux detecting sensors, 102a or S0, 102b or S1, 102c or S2, 102d or S3, 102e or S4, 102f or S5, and/or 102g or S6, to interpolate a finer position located between the current pair of positional signal emitters 88a & 88b, 88b & 88c, 88c & 88d, 88d & 88e, 88e & 88f, 88f & 88g, 88g & 88h, and/or 88h & 88i, determined to be the current coarse position using relative signal or flux strengths of at least a plurality of signals from the current pair of positional signal emitters 88a & 88b, 88b & 88c, 88c & 88d, 88d & 88e, 88e & 88f, 88f & 88g, 88g & 88h, and/or 88h & 88i sensed by the at least plurality of fine position signal strength or flux detecting sensors, 102a or S0, 102b or S1, 102c or S2, 102d or S3, 102e or S4, 102f or S5, and/or 102g or S6.

In a preferred embodiment of an absolute position sensor 80 constructed in accordance with the present invention, the position determining system 84 is configured to operate in a first state that is an unpowered sleep state while no relative movement between the detector 84 and positional signal emitting arrangement 82 takes place while the machine or apparatus is off. The position determining system 84 is further configured to operate in a second state that wakes at least the incremental counting subsystem 94 when relative movement occurs while the machine or apparatus is off having an onboard battery 114 that enables operation of at least the incremental counting subsystem 94 so that any changes in the coarse position of the detector 86 relative to the positional signal emitting arrangement 82 that occur while the machine or apparatus is off are updated using the processor 106 and stored in memory onboard or off-board, e.g., memory 108, the processor 106. Doing so enables at least a coarse position of the detector 86 relative to the positional signal emitting arrangement 82 to be accurately maintained at all times even while the machine or apparatus is not operating, i.e., turned off.

The position determining system 84 of the sensor 80 preferably is even further configured to operate in a third state when the machine or apparatus is turned on by waking or otherwise operating the fine position resolution subsystem 104 to enable fine position information to be determined and provided to the machine or apparatus as needed by the machine or apparatus during machine or apparatus operation. In a preferred embodiment, the fine position resolution subsystem 104 is woken up and operated when electrical power from the machine or apparatus is supplied to the sensor 80, preferably supplied to the position determining system 84, so that fine position information is determined and provided to the machine or apparatus while the machine or apparatus is running or operating.

Such a three stage mode of operation absolute position sensor configuration produces an absolute position sensor 80 constructed in accordance with the present invention that advantageously enables at least coarse position information to be updated while the machine or apparatus is not supplying its electrical power to the sensor 80 by instead drawing sufficient electrical power from its onboard battery 114 to operate the processor 106 and other electrical components 108, 92a, 92b, 92c of at least the incremental counting subsystem 94 when woken up by relative movement when the machine or apparatus is off. This advantageously enables a position sensor 80 in accordance with the present invention to be constructed using less expensive standard electrical components, including an off-the-shelf processor 106, e.g., off-the-shelf microcontrollers, microprocessors, etc., off-the-shelf flash memory 108, and the like which are powered at standard voltages, e.g., at least 2.5 volts and preferably at least volts 3 volts, instead of the more expensive low power controllers and low or zero power memory needed in the past. This also advantageously produces a position sensor 80 in accordance with the present invention that optimizes onboard battery life by only waking up the incremental counting subsystem 94, which requires less power to operate than the fine position resolution subsystem 95 (and which certainly requires less power than needed to operate both the incremental counting subsystem 94 and fine position resolution subsystem 95), and by operating only the incremental counting subsystem 94 using power from onboard battery 114 when relative movement between the detector 86 and positional signal emitting arrangement 82 occurs when the machine or apparatus is off.

With continued reference to FIGS. 1A-3B, a preferred embodiment of a positional signal emitting arrangement 82 is an elongate substantially straight track 116 in which the plurality of pairs of positional signal emitters 88a, 88b, 88c, 88d, 88e, 88f, 88g, 88h, 88i are spaced apart along the track in a predetermined order with a predetermined spacing that enables signals emitted therefrom to be sensed by both (a) the counting signal detecting sensors 92a, 92b, 92c of the coarse position signal detector 89 of the incremental counting subsystem 94 and (b) the fine position signal strength or flux detecting sensors 102a or S0, 102b or S1, 102c or S2, 102d or S3, 102e or S4, 102f or S5, 102g or S6 of the fine position signal detector 98 of the fine position resolution system 104 during operation. In one preferred embodiment, the track 116 is formed of an elongate extrusion that can be made of plastic, aluminum or another nonmagnetic material having a pair of elongate longitudinally extending generally upraised sidewalls 118, 120 spaced apart by an elongate longitudinally extending recessed sensor seating channel 122 in which the positional signal emitters 88a, 88b, 88c, 88d, 88e, 88f, 88g, 88h, 88i are fixed. While the positional signal emitters 88a, 88b, 88c, 88d, 88e, 88f, 88g, 88h, 88i can be directly fixed to the track 116, such as by being potted, fastened, or otherwise attached to the track 116, the positional signal emitters 88a, 88b, 88c, 88d, 88e, 88f, 88g, 88h, 88i can be pre-mounted to a board (not shown), such as a circuit board or the like, which is in turn directly fixed to the track 116, such as by being potted, fastened, or otherwise secured to the track 116.

In one such preferred embodiment of the positional signal emitting arrangement 82, each one of the positional signal emitters 88a, 88b, 88c, 88d, 88e, 88f, 88g, 88h, 88i is a magnet having one of its poles facing outwardly towards any counting signal detecting sensor 92a, 92b, 92c and/or any the fine position signal strength or flux detecting sensor 102a or S0, 102b or S1, 102c or S2, 102d or S3, 102e or S4, 102f or S5, 102g or S6 passing by, e.g., passing over, the magnet with the positional signal emitted from the magnet being a magnetic field of the magnet emanating outwardly towards counting signal detecting sensor 92a, 92b, 92c and/or any the fine position signal strength or flux detecting sensor 102a or S0, 102b or S1, 102c or S2, 102d or S3, 102e or S4, 102f or S5, 102g or S6 passing by, e.g., passing over, the magnet. The positional signal emitting magnets 88a, 88b, 88c, 88d, 88e, 88f, 88g, 88h, 88i of the positional signal emitting arrangement 82 are preferably arranged in a plurality of groups of spaced apart three magnets or magnet triads 124a, 124b, 124c having one magnet 88b, 88e, 88h of each magnet triad 124a, 124b, 124c with its magnetic pole of one magnetic polarity, e.g., south or S, oriented outwardly in a sensor-facing position disposed in the middle between corresponding pairs of adjacent magnets 88a & 88c, 88d & 88f, 88g & 88i, which each have its magnetic pole of an opposite magnetic polarity, e.g., north or N, oriented outwardly in a sensor facing position providing a North-South-North magnet triad arrangement enabling movement direction determination and/or sensor latching or resetting to be done when sensors, such as counting signal detecting sensors 92a, 92b, 92c and/or signal strength or flux detecting sensors 102a or S0, 102b or S1, 102c or S2, 102d or S3, 102e or S4, 102f or S5, 102g or S6 pass by during relative movement. While each magnet triad 124a, 124b, 124b shown in FIGS. 1A-2A, has a North-South-North magnetic polarity arrangement, it should be recognized that each of the plurality of pairs of magnets, i.e., at least three magnets, can be arranged in a different pattern, such as a South-North-South magnetic polarity arrangement, if desired.

In the preferred embodiment of the positional signal emitting arrangement 82 shown in FIGS. 1A-2B, the positional signal emitting arrangement 82 is a positional signal emitting track 116 that includes at least a plurality of pairs of magnet triads 124a, 124b, 124b preferably substantially equidistantly spaced apart from one another by a "missing magnet" space where another magnet would normally be located, labeled "Virtual South," whose absence of any magnetic field or magnetic flux signal can also be used by one or both of the incremental counting subsystem 94, such as by its coarse decision signal detector 89, and/or fine position resolution subsystem 95, such as by its fine position signal detector 98.

In one preferred magnet spacing arrangement where magnetic triads 124a, 124b, 124c are used, magnets having alternating the opposite magnetic polarities are longitudinally equidistantly spaced apart in an alternating equidistantly spaced North-South-North-South-North-South-North-South-North-South-North virtual magnet pattern before removing every other South magnet producing a plurality of pairs of equidistantly spaced apart magnet triads 124a, 124b, 124c each having a North-South-North arrangement with a non-existent "Virtual South" magnet in between each adjacent pair of magnet triads 124a, 124b, 124c. As such, each adjacent pair of magnet triads 124a, 124b, 124c preferably are spaced apart by exactly one magnet or "Virtual South" magnet such as in the manner shown in FIGS. 1A and 2A. Where the magnetic polarity of magnet triads is reversed, e.g., South-North-South, the spacing remains the same with each nonexistent magnet disposed in between adjacent pairs of magnetic triads being a "Virtual North" magnet instead of being a "Virtual South" magnet.

Where magnets are used as the positional signal emitters 88a, 88b, 88c, 88d, 88e, 88f, 88g, 88h, 88i, each magnet used has a sufficiently strong or large enough magnetic field, e.g., sufficiently large magnetic flux magnitude, to be sentenced by counting signal detecting sensors 92a, 92b, 92c and/or signal strength or flux detecting sensors 102a or S0, 102b or S1, 102c or S2, 102d or S3, 102e or S4, 102f or S5, 102g or S6 passing by in close proximity thereto during relative movement during machine or apparatus operation. Magnets suitable for use include magnets rare earth Alnico (AlNiCo), samarium cobalt (SmCo5), or neodymium (NdFeB) magnets. It is contemplated that such positional signal emitting magnets 88a, 88b, 88c, 88d, 88e, 88f, 88g, 88h, 88i, can be round, disc-shaped, generally cylindrical, square and/or generally rectangular, e.g. cubic, in shape.

Where magnets are used as positional signal emitters 88a, 88b, 88c, 88d, 88e, 88f, 88g, 88h, 88i of a positional signal emitting arrangement 82, e.g., magnet carrying track 116, the counting signal detecting sensors 92a, 92b, 92c of the course position signal detector 89 are magnetic field responsive sensors and the fine position signal strength or flux detecting sensors 102a or S0, 102b or S1, 102c or S2, 102d or S3, 102e or S4, 102f or S5, 102g or S6 preferably are also magnetic field responsive sensors. The counting signal detecting sensors 92a, 92b, 92c preferably are digital value outputting magnetic field responsive sensors that output a digital signal, pulse or count only when a magnetic field or flux of sufficient magnitude or intensity, e.g. greater than a magnetic field or flux threshold, is detected. In a preferred embodiment, each one of the counting signal detecting sensors 92a, 92b, 92c is a Wiegand wire but can be another suitable type of digital value outputting magnetic field responsive sensor, such as a reed relay, digital hall switch or another type of sensor digitally responsive to a magnetic trigger. As discussed in more detail below, the fine position signal strength or flux detecting sensors 102a or S0, 102b or S1, 102c or S2, 102d or S3, 102e or S4, 102f or S5, 102g or S6 are magnetic field or flux strength responsive sensors outputting an analog signal whose signal magnitude relates, e.g., is proportional, to the strength of the magnetic field or flux detected by the sensor as long as a magnetic field or flux of sufficient strength is detected. In a preferred embodiment, each one of the fine position signal strength or flux detecting sensors 102a or S0, 102b or S1, 102c or S2, 102d or S3, 102e or S4, 102f or S5, 102g or S6 is a hall sensor.

The position sensor preferably is an absolute position sensor that even more preferably is an absolute linear position sensor. While such a position sensor constructed in accordance with the present invention is capable of "infinite length" use, it should be readily apparent that it is not limited to "infinite length" use. The position sensor has a positional signal emitting arrangement that can be formed of a long line (string) of spaced apart magnets mounted to or otherwise carried by or in a track, or other holder and/or arranged in such a manner using another suitable mounting method. During operation, a detector passes over the track in a continuous fashion during relative movement therebetween. A first detector circuit reads and counts each desired magnet pole as it passes over it, to accumulate the incremental distance between each magnet. The sum of magnet distances is then added to the distance calculated by the second detector circuit which interpolates the magnetic flux strength between the incremental magnets. The length of the magnet track limited only by the number of bytes used to store the incremental data.

In one preferred embodiment, a 64 bit number or result obtained where magnets at ½ inch intervals would theoretically enable measurement of lengths or distances as great as 1.455 EE 14 miles with interpolating to 8 bits of data using a method of interpolation in accordance with that disclosed herein results in fine position determination to within 0.003 inch accuracy. In other word, fine position measurement accuracy is provided with a position sensor constructed in accordance with the present invention that is greater than believed previously done in conventional linear position sensors.

Components of a preferred embodiment of an absolute position sensor equipped with a position determining system having fine position resolution using interpolation in accordance with the present invention include (a) an elongate track containing magnets spaced at even intervals; (b) a detector comprised of two separate measuring elements including (i) digital (on/off) value sensors to detect and count the magnets on an incremental basis providing coarse position, and (ii) analog (scalar) value sensors used in interpolating the position between the incremental magnets providing fine position, and (c) a processor, preferably a central processor, used to (i) sum and store incremental magnet count to provide coarse position and/or coarse motion, and (ii) process and the scalar magnetic flux values to resolve fine position between magnets. The Detector is comprised of two parts, the incremental counting unit or subsystem—ICU, which provide coarse position, and the magnetic (flux) interpolation unit—MIU, which is a fine position resolution subsystem that provides fine position. The position being the detector being the sum of the data contained in the ICU plus the MIU.

The incremental counting unit subsystem counts the magnet poles in the Track or holder as the Detector passed over them. (4)—See FIGS. 1A-3B. Unless a secondary process is in place to re-sync the count (5)—The Track magnets must be encountered as a continuous stream, (6) devoid of gaps or inconsistency. The detector may be composed of many various forms of magnetic signaling devices, or multiple forms of signaling device. Devices known to the profession include, digital hall switches, reed relays, Wiegand Wires, or any device known or unknown which responds to a magnetic trigger. The only necessary factor for a detector sensor is that as the Detector sensor passes over the string of magnets, (7) the sensors must detect the presence of the magnetic flux, (8) to signal the next increment of motion.

The Sensors in the ICU may be arranged in such a manner as to detect direction of motion.

A non-continuous track may be assembled by implementing a sync device, (10), such as a limit switch, bar code reader, analog Hall sensor, or any manor of device known or unknown to the industry which could be used to signal the resumption of counting by triggering a preset count in the ICU or its host device, at the end of the discontinuity of the magnet track. Thus a very great distance may be composed or otherwise formed of several short section of track for positioning in several finite spaces with long gaps between the measuring areas.

The MIU is a fine position resolution subsystem that detects and processes the varying magnetic field(s) between the (incremental) magnet poles. (11) The varying field between the magnet poles of the counting magnets, is a byproduct of the permeability of the medium between the poles. It is consistent and predictable for the medium though which the flux lines pass, generally, a vacuum, air, water, or non-ferrous material. The MIU senses and measures the field strength between any two adjacent magnet poles straddled by the MIU. The scalar value of the field strength decreases as the distance from the magnet pole increases. (12) The MIU is composed of one or more flux sensors, (13) disposed by a fixed distance, (14) less than the distance between the counting magnets. (15) MIU Flux sensors, must return a value independent of Z axis separation. See FIG. 2B—(16) As changes in flux values due to Z axis separation would be interpreted as translation information, and thus be a cause for error. MIU sensors must also calculate position without absolute lower and upper boundaries to the flux value data. See FIG. 5B—(17) Due to the large number of magnets in the track, and the natural variability of the flux density in any and each individual magnet, a relationship between absolute value of the flux density between two adjacent magnets and the position between magnet poles cannot be guaranteed. Thus the MIU cannot work with absolute vales, but must work with relative values. The MIU accomplishes this my placing a magnet flux sensor on either side of the ICU magnetic signaling device. (18) Thus the MIU detects and compares the RATIO, of the values from two MIU sensors. When the values are equal, the MIU detectors are equidistant from the ICU incremental magnet. And the ICU detector is directly above the counting magnet, The 'ZERO' position. (19) As the MIU sensors translate, the RATIO of the values predicts the position between the two ICU magnets. (20) The greater value indicating the direction of travel. (21) The value calculated by the MIU is then added to the value summed by the ICU to obtain the gross and fine sensor position on the TRACK or magnet string (22).

The ICU is responsible for counting the incremental magnets on the track, and summing the data to create absolute position information. A single sensor, while able to detect the magnet increment, cannot determine direction. See FIG. 5B—(23). A single ICU sensor is activated when the magnet passes into is area of sensitivity. That motion could be from the increment or the decrement direction. A single sensor cannot resolve the data for both count and direction. See FIG. 6B—(24). Adding a second sensor, allows for both direction and incremental data, providing that the magnet motion is not circular. (25). A third sensor may be used and preferably is necessary in order to account for all the degrees of freedom present including (i) approach from increment (26), (ii) approach from decrement (27), and/or (iii) approach from increment or decrement with direction reversal (28).

Regardless of the technology chosen for the ICU sensor, all sensors activate in a window, i.e., sensor activation window, [See FIGS. 5B & 6B—(29)] which is translated into linear error. Each sensor has a window, which results in the activation at a different linear point, when the sensor is approached from the increment and decrement directions, (30). This results in a linear measurement error which must be corrected for by the MIU. See FIGS. 5B and/or 6B—(31).

With regard to the MIU sensors, preferably 3D Hall sensors, the MIU detects and interpolates the flux values between the incremental magnets. (32) This flux value is not bounded by any fixed value. See FIG. 4B—(33) The upper and lower limits of the flux values are a function of the strength of the magnet being inspected and the z axis distance between the sensor and the magnet. (34) Thus a single sensor, while able to determine the flux value—a single sensor does not have a frame of reference with absolute foundries. See FIG. 4B—(35). Thus, a second sensor can be and preferably is necessary (36)—with the sensor pair positioned on either of the incremental magnet, at equal distances. (37) This arrangement results in each pair of magnets, retuning a flux value, (38), The RATIO of the flux values, are interpreted as a unit-less value—representing the position on the magnet pair around the incrementing magnet. Therefore, since both MIU sensors ore inspecting the same magnet, the magnet is located equidistant between the sensors when the values from both the sensors are the same. (39) The RATIO being 1. See FIG. 4B—(40) This RATIO continues, as the magnets translate across the MIU. (41) Thus the RATIO predicts the MIU position over the incrementing magnet string. See FIG. 4B—(42).

In correcting for ICT sensor activation window error, the MIU resolves the magnet string as described above, and locates the center or line at which the count will increment or decrement. See FIG. 8B—(43) Thus when the MIU passes the Increment or decrement command to the controlling processor, the processor holds the process off, until the MIU signals the magnet center (ZERO Position). (44) At this point the Central Processor causes the count to increment or decrement based on direction information from the MIU ICU data. See FIG. 8B—(45). This process then corrects for and cures the ICU window error situation.

Window error can also manifest itself in forth and back motion. With regard to (46), please see FIGS. 9A-10B. If a motion translates across the imagined width-less increment/decrement line, causing the central processor if alter position value, and then reverses direction, crossing back across the imagined width-less increment/decrement line, an error in measurement will occur if corrective action is not taken. (47) Thus a history of the direction information can be and preferably is maintained by the Central Processor, and compared against the data returned by the MIU. (48) In a preferred embodiment, the direction information history must be and is maintained by the Central Processor either in memory onboard the Central Processor or in memory, e.g., non-volatile memory (flash memory), linked to the Central Processor. Upon a direction change, and a translation on the width-less increment/decrement line by the MIU sensors, the count value which had been previously incremented or decremented, must be restored. (50).

Thus, the ICU is responsible for increment/decrement operations on the gross motion, (51) and the ICU data coupled with Central Processor historical information is responsible for increment/decrement on fine motion. With regard to (52), please see FIGS. 9A-10B. Creating a total motion profile. (53).

With regard to track extension error(s) and correction of such error(s), described motion has to this point only concerned itself with the interaction between a single magnet and the MIU With regard to (54), please see FIGS. 11A-11B. Errors occur when the MIU translates from a single magnet to the next adjacent magnet. (55) At some point, the one of the MIU sensors is located directly over the width-less increment/decrement line causing the position ratio to become meaningless. (56) This error condition is cured with the addition of another MIU position sensor. With regard to (57), please see FIG. 11B. As translation occurs, sensors S0 and S1 are responsible for the RATIO which represents position information. When sensor S0 value equals sensor S2—the S0 S2 ratio becomes dominate, indicating the ½ magnet motion position (57). This causes the Central Processor to switch from comparing S0/S1 ratio to the S0/S2. The pattern of monitor and switch then continues down the track (58)—translating from sensor pair to sensor pair and the magnet traverses across the face of the MIU.

Comparison switching preferably is triggered by the ICU boundary. The magnet track—being composed of an endless string of magnets, forces the MIU to shift from one local magnet to the next. (58) This shift is not random, it is periodic triggered by the detection of an ICU sensor boundary. Each Sensor Boundary signals the ICU that an Increment or Decrement event will occur if motion continues in the same direction. Simultaneously, the MIU ratio sensors are translating past the point of valid data, The ICU boundary event—triggers the Central Processor that a new set of sensors is in position, and the comparison algorithm should switch to the next sensors now in position. (59).

With reference to FIGS. 5A-7B, in carrying out the counting and measuring cycle, as the magnet track approaches the sensor group, the NORTH magnet resets WW3 as it passes the WW TRIP BOUNDARY, WW3 is now reset, ready for a set magnet. With regard to (60), please see FIG. 15. As relative track motion continues, the south magnet begins to pass under the S6 and the MIU stars to process magnet position data. The SOUTH magnet passes the WW TRIP BOUNDARY, and causes the ICU to process a counting pulse. This pulse is held, not causing a count function because the S4/S5 ration does not yet equal 1. Motion of the magnet track now causes the leading NORTH magnet to pass the WW2 TB, resetting WW2, for the subsequent count pulse. The Magnet now passes under S5—and satisfies the S4/S5, 1 relationship. The ICU now process the previous count pulse, and the systems records 0.5 inches of travel. The position is equal to the count (1)*(0.5)+S4/S6 Ratio. With regard to (62) (61), please see FIGS. 16-17. Relative motion continues, the EMU continues monitoring the Hall sensors, and calculating position with the S4/S6 ratio occurs, until the S4/S5 ratio reaches 1. The EMU then switches to using the S4/S5 ration as position information. The position is equal to the count (1)*(0.5)+ 0.25+S4/S5 Ratio. (63). The ICU holds off the WW count until the WW WIDTH-LESS INC/DEC line is crossed, which is now assumed to be the standard of operation, and will not be included in the motion description. The Hall Sensors now continue to process S4/S5 until S3=S5. This ration is now the measurement ratio. The position is equal to the count (1)*(0.5)+0.5+S3/S5 Ratio. (64). Motion continues [with regard to (65) (66) (67) (68) (69) (70), please see FIGS. 20-25] the WW ratio pair switching as the data becomes indeterminate due to a magnet being directly under a sensor, thus the ration pairs shift to the pair split by the magnet resulting in an Sx/Sy=1 relationship. This process is continued, but altered slightly at the magnet triad boundary.

Nor the ratio pairs are not adjacent to each other. The Sensors at each end of the EMU inspect the magnets at the end of the triad group, using S0/S6 and S1/S5 pairs. (71) Thus the extension across the magnet Triad gap is spanned, and a new magnet set begins at (60) for the next count pass.

The above can be adapted, modified or otherwise implemented in other types and kinds of position sensing devices. Any device or sensor, which responds to magnetic fields to provide the impulse of counting, trigger or pulse upon sensing magnetic field(s), may be substituted for the Wiegand Wires in the ICU. Suitable devices or sensors capable of being substituted in place of the Wiegand Wires in the ICU include Reed Relays and/or Digital hall switches, and/or any other type of suitable device or sensor so long as the device or sensor substituted in place of each Wiegand Wire of the ICU provides or outputs the same or suitable similar pulse count function as the Wiegand Wires, and operation of the substituted device or sensor functions substantially the same way as does Wiegand Wires, e.g., function with, in or using the same operating pattern as Wiegand Wires do. Any device which senses the ration of the magnetic field may be substituted for the 3D Hall sensors in the EMU. The only requirement is that the device sense the relative position of the sensor from the intensity of the magnetic flux lines. Similar operation could be described with light as the EMU sense field, or radio waves, or sound Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. An absolute position sensor comprising:
a detector having a plurality of Wiegand wires and a plurality of Hall sensors that sense a magnet of a track carrying a plurality of pairs of the magnets in incrementing or decrementing a coarse position counter and resolving a fine position between magnets using interpolation;
wherein each Wiegand wire is bracketed by a pair of Hall sensors that sense the same magnet triggering the Wiegand wire bracketed thereby outputting analog signals whose ratio is monitored until the ratio reaches a threshold indicating the magnet has moved to a position relative to the triggered Wiegand wire bracketed thereby necessitating a change in a count of the coarse position counter; and
wherein when the ratio of the signal of the one Hall sensor disposed to one side of the triggered Wiegand wire relative to the signal of the other Hall sensor disposed to the other side of the triggered Wiegand wire reaches one or unity, the count of the coarse position counter is changed.

2. The position sensor of claim 1, wherein each Wiegand wire comprises a counting signal detecting sensor, and wherein each one of the magnets of the track comprises a positional signal emitter which emits a magnetic field or a magnetic flux that triggers the Wiegand wire of an adjacent one of the counting signal detecting sensors outputting a signal from the Wiegand wire of the adjacent one of the counting signal detecting sensors providing a coarse position of the one of the magnets of the track triggering the Wiegand wire of the adjacent one of the counting signal detecting sensors.

3. The position sensor of claim 1, wherein the plurality of pairs of magnets are arranged in a plurality of groups of magnets each having a plurality of magnets spaced apart from each other by a first distance with each one of the plurality of groups of magnets spaced apart from each other by a second distance that is greater than the first distance.

4. The absolute position sensor of claim 1, wherein there is another Hall sensor in-line with each Wiegand wire and disposed between the corresponding pair of Hall sensors bracketing or straddling the Wiegand wire.

5. The position sensor of claim 1, wherein the track is elongate and substantially straight, wherein the track is made of a nonmagnetic material, and wherein each one of the plurality of pairs of magnets are fixed to the track.

6. The position sensor of claim 1, further comprising a processor configured to obtain a fine position of the same magnet triggering the Wiegand wire from the ratio of the signal of the one Hall sensor disposed to one side of the triggered Wiegand wire to the signal of the other Hall sensor disposed to the other side of the triggered Wiegand wire.

7. An absolute position sensor comprising:
(a) a detector having (i) a coarse position detector comprised of a digital value magnetic field sensor that outputs a signal when a magnetic field or flux of one of a plurality of pairs of spaced apart magnets is sensed thereby, the signal indicative of a coarse position of the sensed one of the magnets and (ii) a fine position detector comprised of a pair of spaced apart analog value magnetic field sensors that each senses a respective strength of the magnetic field or flux of the sensed one of the magnets and outputs an analog signal whose value is proportional to the respective sensed magnetic field of flux strength of the sensed one of the magnets sensed by the analog value magnetic field sensors, and
(b) a position determining system comprised of a fine position resolution subsystem that receives the values of the analog signals from the pair of analog value magnetic field sensors respectively sensing the respective magnetic field or flux strength of the sensed one of the magnets, the position determining system configured to obtain a ratio of the values of the analog signals from the pair of analog value magnetic field sensors respectively sensing the magnetic field or field strength of the sensed one of the magnets, the ratio corresponding to a position where the sensed one of the magnets is located between the pair of analog value magnetic field sensors.

8. The position sensor of claim 7, wherein the fine resolution subsystem is further configured to correct coarse position error.

9. The position sensor of claim 7, wherein the digital value magnetic field sensor comprises a Wiegand Wire, and wherein the analog value magnetic field sensors each comprise a Hall sensor.

10. The position sensor of claim 9, wherein each Hall sensor comprises a 3D Hall sensor.

11. The position sensor of claim 7, wherein the digital value magnetic field sensor comprises one of a reed relay and digital Hall switch, and wherein the analog value magnetic field sensors each comprise a Hall sensor.

12. The position sensor of claim 11, wherein the digital value magnetic field sensor is disposed interjacent the pair of analog value magnetic field sensors.

13. The position sensor of claim 9, wherein the magnet field sensor and analog value magnetic field sensors are laterally spaced apart in a direction generally parallel to a direction of spacing of the plurality of pairs of magnets, and wherein the sensors are arranged with one of the analog value magnetic field sensors laterally spaced from and disposed to one side of the digital value magnetic field sensor and the other one of the analog value magnetic field sensors laterally spaced from and disposed to an opposite side of the digital value magnetic field sensor.

14. The position sensor of claim 13, wherein the digital value magnetic field sensor is disposed interjacent the pair of analog value magnetic field sensors.

15. The position sensor of claim 7, wherein the analog value magnetic field or flux sensors output a scalar value proportional to the strength of the magnetic field or magnetic flux of the sensed magnet sensed by the analog value magnetic field or flux sensors with the fine position resolution determining system configured to obtain a ratio of the scalar values of the signals outputted by the analog value magnetic field or flux sensors that is a scalar ratio.

16. The position sensor of claim 7, wherein the plurality of pairs of spaced magnets are carried by an elongate substantially straight track.

17. The position sensor of claim 7, wherein there are a first plurality of pairs of the spaced apart magnets disposed side by side one another and arranged with alternating magnetic poles, and a second plurality of pairs of spaced apart magnets disposed side by side one another and arranged with alternating magnetic poles, and wherein the first plurality of pairs of spaced apart magnets are spaced apart a distance from the second plurality of pairs of spaced apart magnets by a distance different than a spacing between each one of the magnets of the first and second plurality of pairs of spaced apart magnets.

18. The position sensor of claim 17, further comprising an elongate substantially straight track to which the magnets of first and second plurality of pairs of magnets are fixed.

19. An absolute position sensor comprised of:
(a) an elongate track carrying a plurality of pairs of magnets spaced apart along the track; and
(b) a position detecting head disposed adjacent the track, the position detecting head comprising:
(1) a coarse position signal detector having a counting signal detecting sensor comprised of a Wiegand wire that outputs a signal when a magnetic field or magnetic flux of an adjacent one of the magnets moving relative to the head triggers the Wiegand wire;
(2) a fine position signal detector comprised of a pair of spaced apart magnetic field or magnetic flux strength sensors with one of the magnetic field or magnetic flux strength sensors disposed to one side of the Wiegand wire and the other one of the magnetic field or magnetic flux strength sensors disposed to the other side of the Wiegand wire, the pair of magnetic field or magnetic flux strength sensors respectively outputting a signal whose value relates to the strength of the magnetic field or magnetic flux of the adjacent one of the magnets triggering the Wiegand wire; and
(3) a processor (i) configured with a coarse position counter used to determine a coarse position of the track relative to the head, (ii) configured to increment or decrement the coarse position counter indicative of a change in the position of the track relative to the head a) when a signal is outputted by the counting signal detecting sensor when relative movement between the track and head causes an adjacent one of the magnets to trigger the Wiegand wire, and b) upon a ratio of the signal values outputted by the pair of magnetic field or magnetic flux strength sensors sensing magnetic field or magnetic flux of the adjacent one of the magnets triggering the Wiegand wire reaching one or unity during the relative movement between the track and head resulting in the adjacent one of the magnets triggering the Wiegand wire; and (iii) configured to determine a position of the track relative to the head more precise than the coarse position by using the ratio of the signal values outputted by the pair of magnetic field or magnetic flux strength sensors sensing the magnetic field or magnetic flux of the adjacent one of the magnets triggering the Wiegand wire, the ratio of the signal values outputted by the pair of magnetic field or magnetic flux strength sensors corresponding to a position where the adjacent one of the magnets triggering the Wiegand is located between the pair of magnetic field or magnetic flux strength sensors.

20. The position sensor of claim 19, wherein the track is elongated and substantially straight, wherein the magnets are spaced apart along the track having substantially the same distance between adjacent magnets, and wherein the magnets are arranged with alternating magnetic poles facing generally towards the position detecting head.

21. The position sensor of claim 19, wherein each one of the pair of the magnetic field or magnetic flux strength sensors comprises a Hall sensor that respectively outputs an analog signal having a value or magnitude proportional to the strength of the magnetic field or magnetic flux of the adjacent one of the magnets triggering the Wiegand wire when sensed thereby.

22. The position sensor of claim 19, wherein one of the magnetic field or magnetic flux strength sensors is spaced from the Wiegand wire substantially the same distance the other one of the magnetic field or magnetic flux strength sensors is spaced from the Wiegand wire.

23. The position sensor of claim 19, further comprising another magnetic field or magnetic flux strength sensor disposed in between the pair of the magnetic field or magnetic flux strength sensors, and wherein each one of the magnetic field or magnetic flux sensors are disposed side-by-side one another.

24. The position sensor of claim 19, wherein the coarse position signal detector comprises a plurality of pairs of the counting signal detecting sensors arranged side-by-side and spaced apart from one another; wherein the fine position signal detector comprises a plurality of pairs of the magnetic field or magnetic flux strength sensors arranged side-by-side and spaced apart from one another; and wherein there is a first pair of the magnetic field or magnetic flux strength sensors bracketing a first one of the counting signal detecting sensors, a second pair of the magnetic field or magnetic flux strength sensors bracketing a second one of the counting signal detecting sensors, and a third pair of the magnetic field or magnetic flux strength sensors bracketing a third one of the counting signal detecting sensors.

* * * * *